US011756779B2

(12) United States Patent
Taghioskoui

(10) Patent No.: US 11,756,779 B2
(45) Date of Patent: *Sep. 12, 2023

(54) APPARATUS AND METHOD FOR TRANSFERRING IONS BETWEEN TWO ANALYTICAL SYSTEMS

(71) Applicant: Trace Matters Scientific LLC, Somerville, MA (US)

(72) Inventor: Mazdak Taghioskoui, Somerville, MA (US)

(73) Assignee: Trace Matters Scientific LLC, Somerville, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/570,279

(22) Filed: Jan. 6, 2022

(65) Prior Publication Data

US 2022/0208536 A1    Jun. 30, 2022

Related U.S. Application Data

(63) Continuation of application No. 17/071,458, filed on Oct. 15, 2020, now Pat. No. 11,222,776, which is a continuation of application No. 16/350,396, filed on Jul. 12, 2018, now Pat. No. 10,840,077.

(60) Provisional application No. 62/680,592, filed on Jun. 5, 2018.

(51) Int. Cl.
*H01J 49/06* (2006.01)
*G01N 27/62* (2021.01)
*G01N 27/622* (2021.01)

(52) U.S. Cl.
CPC ......... *H01J 49/062* (2013.01); *G01N 27/622* (2013.01); *H01J 49/068* (2013.01)

(58) Field of Classification Search
CPC ..... H01J 49/062; H01J 49/068; G01N 27/622
USPC .............................. 250/281, 282, 283, 288
See application file for complete search history.

(56) References Cited

U.S. PATENT DOCUMENTS

| | | | |
|---|---|---|---|
| 5,572,035 A | 11/1996 | Franzen | |
| 6,107,328 A | 8/2000 | Parsons | |
| 6,107,628 A | 8/2000 | Smith et al. | |
| 6,231,054 B1 | 5/2001 | Allen, Jr. et al. | |

(Continued)

FOREIGN PATENT DOCUMENTS

| | | |
|---|---|---|
| EP | 1566828 | 2/2005 |
| EP | 1825495 | 11/2011 |

(Continued)

OTHER PUBLICATIONS

Ehlert, Sven, et al., "Rapid on-site detection of explosives on surfaces by ambient pressure laser desorption and dlirect inlet single photon ionization or chemical ionization mass spectrometry", Anal Bioanal Chem, 2013, pp. 5979-6993, Springer.

(Continued)

*Primary Examiner* — Nicole M Ippolito
(74) *Attorney, Agent, or Firm* — Lee & Hayes, P.C.

(57) ABSTRACT

An apparatus includes a tubular connector having a longitudinal axis. The connector includes a first end that connects to a first analytical system, a second end that connects to a second analytical system, and a flexible portion between the first end and the second end that curves in a direction transverse to the axis of the connector such that the connector contains ion guides to transfer ions between the first analytical system and the second analytical system.

25 Claims, 26 Drawing Sheets

(56) References Cited

U.S. PATENT DOCUMENTS

| | | | |
|---|---|---|---|
| 6,369,383 | B1 | 4/2002 | Cornish et al. |
| 6,583,408 | B2 | 6/2003 | Smith et al. |
| 6,849,848 | B2 | 2/2005 | Baranov et al. |
| 7,365,317 | B2 | 4/2008 | Whitehouse et al. |
| 7,391,021 | B2 | 6/2008 | Stoermer et al. |
| 7,423,261 | B2 | 9/2008 | Truche et al. |
| 7,492,822 | B2 | 2/2009 | Cotton et al. |
| 7,700,913 | B2 | 4/2010 | Musselman |
| 7,705,297 | B2 | 4/2010 | Musselman |
| 7,786,435 | B2 | 8/2010 | Whitehouse et al. |
| 7,838,826 | B1 | 11/2010 | Park |
| 7,888,635 | B2 | 2/2011 | Belov et al. |
| 7,919,747 | B2 | 4/2011 | Green et al. |
| 7,928,364 | B2 | 4/2011 | Musselman |
| 7,982,183 | B2 | 7/2011 | Makarov et al. |
| 8,008,617 | B1 | 8/2011 | Berends, Jr. et al. |
| 8,049,169 | B2 | 11/2011 | Satake et al. |
| 8,222,597 | B2 | 7/2012 | Kim et al. |
| 8,242,440 | B2 | 8/2012 | Splendore et al. |
| 8,309,916 | B2 | 11/2012 | Wouters et al. |
| 8,507,848 | B1 | 8/2013 | Ding et al. |
| 8,637,817 | B1 | 1/2014 | Krutchinsky et al. |
| 8,759,757 | B2 | 6/2014 | Hardman et al. |
| 8,835,839 | B1 | 9/2014 | Anderson et al. |
| 8,969,800 | B1 | 3/2015 | Tolmachev et al. |
| 9,324,548 | B1 | 4/2016 | Benter et al. |
| 9,966,244 | B2 | 5/2018 | Anderson et al. |
| 10,460,920 | B1 | 10/2019 | Smith et al. |
| 10,840,077 | B2 * | 11/2020 | Taghioskoui ......... H01J 49/062 |
| 11,222,776 | B1 * | 1/2022 | Taghioskoui ......... H01J 49/062 |
| 2001/0020679 | A1 | 9/2001 | Franzen |
| 2004/0026611 | A1 | 2/2004 | Bateman et al. |
| 2007/0138384 | A1 | 6/2007 | Keiser |
| 2008/0116370 | A1 | 5/2008 | Splendore et al. |
| 2008/0142698 | A1 | 6/2008 | Atherton et al. |
| 2008/0308721 | A1 | 12/2008 | Senko et al. |
| 2009/0045330 | A1 | 2/2009 | Wang et al. |
| 2009/0173880 | A1 | 7/2009 | Bateman et al. |
| 2009/0206250 | A1 | 8/2009 | Wollnik |
| 2009/0321655 | A1 | 12/2009 | Makarov et al. |
| 2011/0024618 | A1 | 2/2011 | Brown et al. |
| 2011/0049357 | A1 | 3/2011 | Giles |
| 2011/0101216 | A1 | 5/2011 | Musselman |
| 2011/0168882 | A1 | 7/2011 | Hoyes |
| 2011/0192969 | A1 | 8/2011 | Verentchikov |
| 2011/0240844 | A1 | 10/2011 | Ouyang et al. |
| 2012/0153141 | A1 | 6/2012 | Wouters et al. |
| 2012/0261570 | A1 | 10/2012 | Shvartsburg et al. |
| 2012/0312979 | A1 | 12/2012 | Cooks et al. |
| 2013/0175440 | A1 | 7/2013 | Perelman et al. |
| 2013/0306861 | A1 | 11/2013 | Papanastasiou et al. |
| 2015/0076343 | A1 | 3/2015 | Tolmachev et al. |
| 2015/0287578 | A1 | 10/2015 | Bendall et al. |
| 2016/0181080 | A1 | 6/2016 | Williams |
| 2016/0225598 | A1 | 8/2016 | Ristroph |
| 2016/0322209 | A1 | 11/2016 | Wouters et al. |
| 2017/0076931 | A1 | 3/2017 | Ibrahim et al. |
| 2017/0184552 | A1 | 6/2017 | Guzzonato et al. |
| 2017/0350860 | A1 | 12/2017 | Rather et al. |
| 2018/0238776 | A1 | 8/2018 | Karancsi et al. |
| 2019/0267221 | A1 | 8/2019 | Pringle et al. |
| 2019/0371591 | A1 | 12/2019 | Taghioskoui |
| 2020/0015717 | A1 | 1/2020 | Taghioskoui |
| 2020/0111655 | A1 | 4/2020 | Taghioskoui |
| 2022/0202317 | A1 | 6/2022 | Taghioskoui |

FOREIGN PATENT DOCUMENTS

| | | |
|---|---|---|
| EP | 3038134 | 12/2015 |
| EP | 3252460 | 4/2017 |
| GB | 2499587 | 8/2013 |
| WO | WO2016034125 | 3/2016 |
| WO | WO2018048494 | 3/2018 |

OTHER PUBLICATIONS

Garimella et al., "Simulation of Electric Potentials and Ion Motion in Planar Electrode Structures for Lossless Ion Manipulations (SLIM)," J. Am. Soc. Mass Spectrom. 25(11):1890-1896 (Nov. 2014).

Giles et al., "A method for direct measurement of ion mobilities using a travelling wave ion guide," International Journal of Mass Spectrometry, 298(1 ): 10-16 (Dec. 2010).

Giles et al., "Applications of a travelling wave-based radio-frequency-only stacked ring ion guide," Rapid Commun. Mass Spectrom., 18(20):2401-2414 (Oct. 30, 2004).

Giles et al., "Enhancements in travelling wave ion mobility resolution," Rapid Commun. Mass Spectrom., 25 (11):1559-1566 (Jun. 15, 2011).

Glaskin et al., "Ion Trapping for Ion Mobility Spectrometry Measurements in a Cyclical Drift Tube," Anal. Chem., 85 (15):7003-7008 (Jul. 2013).

Hamid et al., "Characterization of Traveling Wave Ion Mobility Separations in Structures for Lossless Ion Manipulations," Anal. Chem., 87: 11301-11308 (Oct. 28, 2015).

Hars, et al., "Flexible ion conduit for use under rarefied atmospheric conditions", Review of Scientific Instruments 68, 3351 (1997), Jun. 4, 1998; entire document; especially Fig. 2, 3, pp. 3351-3354; < https://aip.scitation.org/doi/abs/10.1063/1.1148296 > last visited May 27, 2020.

Hendricks, Paul I, et al., "Autonomous in Situ Analysis and Real-Time Chemical Detection Using a Backpack Miniature Mass Spectrometer: Concept, Instrumentation Development, and Performance" Analytical Chemistry, 2014, [pp. 2900-2908, 86, ACS Publications.

Ibrahim et al., "Development of a new ion mobility (quadrupole) time-of-flight mass spectrometer," International Journal of Mass Spectrometry, 377:655-662 (Feb. 1, 2015).

Ibrahim et al., "New frontiers for mass spectrometry based upon structures for lossless ion manipulations," The Analysyst, 142(7):1010-1021, Mar. 3, 2017, 24 pages.

Merenbloom et al., "Effects of Select Anions from the Hofmeister Series on the Gas-Phase Conformations of Protein Ions Measured with Traveling-Wave Ion Mobility Spectrometry/Mass Spectrometry," J. Am. Soc. Mass Spectrom. 22:1978-1990 (Nov. 22, 2011).

Non Final Office Action dated Jan. 7, 2020 for U.S. Appl. No. 16/151,162 "Reconfigurable Sequentially-Packed Ion (SPION) Transfer Device" Taghioskoui, 9 pages.

Office Action for U.S. Appl. No. 17/071,458, dated May 27, 2021, Taghioskoui, "Ion Analysis System and Method With Multiple Ionization Sources and Analyzers", 5 pages.

Office Action for U.S. Appl. No. 16/509,016, dated Feb. 22, 2021, Taghioskoui, "Reconfigurable Sequentially-Packed Ion (Spion) Transfer Device and System", 10 pages.

Non Final Office Action dated May 1, 2020 for U.S. Appl. No. 16/350,396 "Reconfigurable Sequentially-Packed Ion (SPION) Transfer Device" Taghioskoui, 10 pages.

Office Action for U.S. Appl. No. 16/151,162, dated Jun. 26, 2019, Taghioskoui, "Reconfigurable Sequentially-Packed Ion (SPION) Transfer Device", 7 pages.

PCT Search Report and Written Opinion dated May 22, 2020 for PCT Application No. PCT/IB19/55944, 15 pages.

Pringle et al., "An investigation of the mobility separation of some peptide and protein ions using a new hybrid quadrupole/travelling wave IMS/oa-ToF instrument," International Journal of Mass Spectrometry, 261 (1 ):1-12 (Mar. 1, 2007).

Schelten, J et al., "Properties an limitations of an Ion Guide, Nuclear Instruments and Methods in Physics Research" A292, 1990, 45-51, North Holland, Elsevier Science Publishers BY.

Shvartsburg et al., "Fundamentals of Traveling Wave Ion Mobility Spectrometry," Anal. Chem., 80(24):9689-9699 (Dec. 15, 2008).

Smith et al., "Deciphering drift time measurements from travelling wave ion mobility spectrometry-mass spectrometry studies," European Journal of Mass Spectrometry, 15(2): 113-130 (Jan. 2009).

(56) References Cited

OTHER PUBLICATIONS

Sobott et al., "A Tandem Mass Spectrometer for Improved Transmission and Analysis of Large Macromolecular Assemblies," Anal. Chem., 74(6):1402-1407 (Apr. 2002).

Tolmachev et al., "Characterization of Ion Dynamics in Structures for Lossless Ion Manipulations," Anal. Chem., 86(18):9162-9168 (Sep. 16, 2014).

Tridas, Eric Miguel et al., "High transmission 3D printed ftex-PCB-based ion funnel", Journal of Mass Spectrometry 2015, pp. 938-943, 50, John Wiley & Sons.

Webb et al., "Experimental Evaluation and Optimization of Structures for Lossless Ion Manipulations for Ion Mobility Spectrometry with Time-of-Flight Mass Spectometry," Anal. Chem., 86(18):9169-9176 (Sep. 5, 2014).

Webb et al., "Mobility-Resolved Ion Selection in Uniform Drift Field Ion Mobility Spectrometry/Mass Spectrometry: Dynamic Switching in Structures for Lossless Ion Manipulations," Anal. Chem., 86(19):9632-9637 (Oct. 7, 2014).

Zhang et al., "Ion Trapping, Storage, and Ejection in Structures for Lossless Ion Manipulations," Anal. Chem., 87(12):6010-6016 (May 2015).

Zhong et al., "Characterizing the resolution and accuracy of a second-generation traveling-wave ion mobility separator for biomolecular ions," The Royal Society of Chemistry, 136(17):3534-3541 (Mar. 2011).

\* cited by examiner

APPARATUS AND METHOD FOR TRANSFERRING IONS BETWEEN TWO ANALYTICAL SYSTEMS

RELATED APPLICATIONS

The present application is a continuation and claims the priority benefit of application Ser. No. 17/071,458 (now U.S. Pat. No. 11,222,776), which claims priority to U.S. application Ser. No. 16/350,396 (now U.S. Pat. No. 10,720,315), which claims priority to Provisional Application No. 62/680,592 entitled: "Flexible Ion Guide," filed on Jun. 5, 2018; the contents and disclosures of which are hereby incorporated by reference in their entireties herein and below.

TECHNICAL FIELD

The present disclosure relates to an ion transfer device. In particular, the present disclosure is related to an ion transfer device that is flexible or re-configurable and may be bent or re-configured from one shape to another shape while transferring ions produced from a sample in a first location using an ion source (such as an ionization probe) to an ion analyzer (such as a mass spectrometer or an ion mobility analyzer) in the second location. The ions may be transferred inside the ion transfer device in sequentially-packed ion packets.

BACKGROUND

Mass spectrometry and ion mobility spectrometry are analytical techniques for chemical analysis to detect and identify analytes of interest in various applications. With the increased use of these instruments, their applications and the variety of applications have increased. However, their size still remains large, hindering their applications in point of care/action/need applications, where size and portability is limiting.

A mass spectrometer is a complex system composed of various components, as shown in FIG. 1A. The critical components of a typical mass spectrometer consist of sample introduction and ionization 1, sampling inlet 2, ion optics and mass analyzer 4, detector 5, vacuum chamber or housing 3, vacuum system 9 including vacuum pumps and gauges, voltage supply systems 6, control systems 7, and data acquisition systems 8. In a typical mass spectrometer, first, the ionization source 1 ionizes a sample to generate positive and negative ions. The generated ions travel through the sampling inlet 2 and are guided, for example by ion guides, such as an ion funnel and/or multipole ion guides, to enter the mass analyzer 4. All of these components are closely connected to each other. The mass analyzer 4, which is derived by voltage supply systems 6, separates ions based on their m/z. The detector 5 produces an electrical signal when the ions hit the detector 5. The data acquisition systems 8 receive the electrical signal from the detector 5, typically in the form of electrical current or voltage, and produce and record spectra. The spectra provide fingerprints for chemical identification of the sample. Control systems 7 control various components. All components related to the mass analysis and ion detection are placed inside a vacuum chamber 3, maintained at high vacuum. Although FIG. 1A shows sample introduction/ionization block 1 outside the vacuum region, ionization of samples may occur in a wide range of pressures, from atmospheric pressure to high vacuum. In a conventional mass spectrometer, the sample introduction/ionization 1 is attached to the sampling inlet 2.

Mass spectrometers require high vacuum for proper operation because, ideally, ions must travel inside a mass spectrometer without colliding with background gas molecules. Therefore, the vacuum in the mass analyzer 4 of a mass spectrometer must be maintained at a pressure that correlates with ion mean free path length longer (ideally several folds) than the length of the mass analyzer. According to the kinetic theory of gases, the mean free path L (in m) is given by: $L = kT/\sqrt{2}\, p\sigma$, where k is the Boltzmann constant, T is the temperature (in K), p is the pressure (in Pa), and $\sigma$ is the collision cross-section (in $m^2$). In a typical mass spectrometer with $k=1.38\times10^{-21}$ $JK^{-1}$, $T=300$ K, and $\sigma=45\times10^{-20}$ $m^2$, the mean free path equation simplifies to $L=4.95/p$, where L is in centimeters and p is in milli-Torr. In laboratory-scale mass spectrometers, ion filtering and detection usually occur in high vacuum, i.e. $<10^{-5}$ Torr, corresponding to a mean free path of >4.95 meters. This is necessary to achieve high resolution separation of ions. To achieve a pressure of $<10^{-5}$ Torr with available vacuum technologies, a two-stage vacuum generation process is utilized. First, the pressure is reduced to $\sim10^{-2}$ Torr using mechanical or roughing pumps, and then one or more turbo-molecular pumps, ion pumps, or cryogenic pumps further reduce the pressure to $<10^{-5}$ Torr. Turbo-molecular pumps provide relatively higher pumping capacities compared to ion pumps and are more appropriate for atmospheric pressure sampling and ionization. Ion pumps have advantages when vibration-free operation and ultra-high vacuum is required (vacuum levels of $<10^{-1}$ Torr).

Prior to the introduction of soft ionization and ambient ionization techniques, mass spectrometry was generally limited to the analysis of volatile, relatively low-molecular-mass samples, and mass spectrometric analysis of biomolecules was difficult if not impossible. Also, conventional ionization sources, such as electron impact ionization, caused excessive fragmentation when applied to biomolecules. The advent of soft ionization techniques, which produce mass spectra with little or no fragmentation in ambient or near-ambient environment, made it possible to analyze large organic molecules and biomolecules with mass spectrometers. In particular, the development of electrospray ionization (ESI) and matrix-assisted laser desorption/ionization (MALDI) has extended the application of mass spectrometry to biomolecules. These techniques have demonstrated unparalleled advantages, for example in analyzing peptides and proteins, because of the speed of experiments, the amount of information generated, and the outstanding resolution and sensitivities offered.

Among various soft ionization techniques, ESI sources are best suited for direct biomolecules. ESI may function as a liquid sample introduction system and an ionization source at the same time. In ESI, the sample in a solution (typically a 50/50 mixture of water/methanol with 0.1-1% acetic or formic acid) enters a narrow capillary and leaves the capillary as a liquid spray. The voltage at the end of the capillary is significantly higher (3 to 5 kV) than that of the mass analyzer, so the sample is sprayed or dispersed into an aerosol of highly charged droplets. Evaporation of solvent decreases the size of the droplets. Because the electrically charged droplets retain their charge but get smaller, their electric field increases. At some point, mutual repulsion between like charges causes ions to leave the surface of the droplet. As a result, multiply charged ions from individual biomolecules, free from solvent, are released and enter the sampling inlet for analysis by the mass spectrometer.

Except for MALDI and similar ionization methods that ionize samples in the high-vacuum region, most mass spectrometry techniques for analyzing bio-molecules rely on interfaces or sampling inlets that deliver gas-phase molecular ions from atmospheric pressure or near atmospheric pressure to high vacuum through orifices or capillaries. Achieving high ion transfer efficiencies for mass spectrometers is crucial and challenging. Conductance limiting orifice plates enable differential pumping of various stages of a mass spectrometer. Smaller orifices enable operation with lower pumping capacities but result in lower ion transfer efficiencies. Larger-diameter orifices may improve the efficiency of ion transfer but allow more neutrals to enter the vacuum region, thus requiring larger, higher-speed pumps to maintain the desired vacuum. Therefore, the pumping capacity of the vacuum system indirectly determines the ion transfer efficiency, because the size and dimensions of the sampling inlet must be designed according to the pumping capacity of the vacuum system. Finding the right balance between the pumping capacity and the ion transfer efficiency is a challenging design consideration for mass spectrometers if a limited pumping capacity is available.

Various sampling mechanisms are developed to address the above-noted challenges, such as the discontinuous atmospheric pressure interface (DAPI) and the pulsed pinhole atmospheric pressure interface (PP-API). The continuous atmospheric pressure interface enabled by differential pumping is another sampling mechanism that uses multi-stage vacuum pumps for differential pumping, to provide gradual pressure reduction to transport ions from atmospheric pressure to high vacuum. The extent to which the motion of ions may be controlled in different vacuum stages determines the overall ion transmission efficiency of the mass spectrometer. Recently, ion funnels have attracted significant interest in atmospheric pressure sampling in addition to the conventional multipole ion guides. Ion funnels enable the manipulation and focusing of ions in a pressure regime (0.01 to 30 Torr), providing much greater ion transmission efficiencies. Usually, ion funnels are located right after heated capillary inlets in a mass spectrometer. Ion funnels are rigid structures that guides ions in mid-vacuum level of 0.01 to 30 Torr. In ion funnels, the spacing between ring electrodes are constant.

Mass analyzers are the core components of mass spectrometers and are typically characterized by their mass range and resolution. Mass range is the maximum mass resolvable mass by the analyzer. Resolution is an indicator of how selective a mass filter is in distinguishing ions with m/z that are close in value. Thus far, various mass analyzers with different mechanisms have been developed. General mass spectrometry handbooks provide detailed descriptions of various mass analyzers. Mass analyzers may be categorized into beam analyzers, such as quadrupole and TOF analyzers, and trapping analyzers, such as ion traps.

Faraday cups and micro channel plate (MCP) detectors are the two most widely used ion detectors in mass spectrometry. Faraday cups may operate at high pressures (up to atmospheric pressure), but are less sensitive, and are not compatible with high-resolution mass spectrometry due to slow response times. MCPs support high mass resolution, dynamic range, and detection sensitivity. Most modern MCP detectors consist of two MCPs, with angled channels rotated 180° from each other, producing a chevron (v-like) shape. The angle between the channels reduces ion feedback. In a chevron MCP, the electrons that exit the first plate initiate the cascade in the next plate. The advantage of the chevron MCP over the straight channel MCP is significantly more gain at a given voltage. The two MCPs may either be pressed together or have a small gap between them to spread the charge across multiple channels.

With the advent of ambient desorption ionization sources, which desorb and ionize molecules in their native state, the applications of mass spectrometers have been extended significantly. For example, ambient desorption ionization techniques may be used to analyze human tissues during a surgery to differentiate cancer cells. As another example, ambient ionization desorption techniques may be used in homeland security to monitor cargo and passengers at security check points for explosives. Three different scenarios have been used thus far for such applications. In the conventional method shown in FIG. 1B, the samples are brought close to a mass spectrometer for ionization and analyses. In this approach, samples are directly place in front of a mass spectrometer. In a second approach shown in FIG. 1C, samples or sample molecules are transferred through a bare tube 19, which may be plastic or metal, into the ion source 11 of the mass spectrometer. A sampling medium, such as water, may be used to mix sample with sampling medium to be transferred through the bare tube to a mass spectrometer. In the third approach shown in FIG. 1D, samples are ionized using an ion source that is detached from a mass spectrometer and the produced ions are transferred via the bare tube 19 to a mass spectrometer for analysis. All of these approaches have disadvantages. For example, placing a sample directly in front of a mass spectrometer (FIG. 1B) may not be practical in many applications, particularly when the sample is bulky or immobile. Second transferring sample molecules via the bare tube 19 to a mass spectrometer (FIG. 2B) may result in memory effects from sample residue/molecules sticking to the inner surface of the bare tube 19. These residues may contaminate the inner side of the bare tube 19 and may adversely affect the analytical results. Transferring ions through bare tube 19, as shown in FIG. 1D, may result in decreased ion transfer efficiency as a majority of ions are lost to the inner walls of the bare tube 19 and deteriorate ion transfer efficiency. In other words, the ion transfer efficiency of this method may not be sufficient, and a majority of ions may be lost in the ion transfer process, thus negatively affecting analytical performance.

SUMMARY

One or more embodiments of the present disclosure relates to a flexible ion transfer device that may transfer ions from a first location to a second location, such that the first location may be in a proximity of where samples to be analyzed are located and the second location is where a mass spectrometer is located. Mass spectrometers are still bulky but the growing demand of mass spectrometers in point of need/care/action, such as medical and security applications require having mass spectrometers more accessible. With the conventional mass spectrometers, that is not possible because mass spectrometers are bulky and large. Further, ambient ionization techniques produce ions from samples in their native environment (such as human tissues during surgery to detect cancer cells). Therefore, the present disclosure aims to provide an improvement over the state-of-the-art by providing a flexible ion transfer device that may be connected between an ambient ion source (which may be constructed as an application-specific or general-purpose ionization probe) in first location and a mass spectrometer in a second location such that the ions produced by the ion source may be efficiently transferred to a mass spectrometer via the flexible ion transfer device. The flexible ion transfer device provides an advantage that an operator/user may easily move the ion source to/around the sample and may produce ions for mass spectrometry analysis without having to bring a mass spectrometer closer to a sample under test. Further, various ion sources or ion source probes may be attached to a single mass spectrometer, which results in more efficient use of a mass spectrometer. It is noted that the sample analysis in a mass spectrometer from the moment ions are produced to the moment the ions are detected by the detector takes milli-seconds to a few seconds. Therefore, mass spectrometers are ideally able to provide continuous analysis every few seconds at most. However, the sample introduction techniques are currently a limiting factor of the process. The time in between two mass spectrometric analyses currently lag behind a mass spectrometers ideal throughput because of the slow sample introduction. Therefore, producing a sequence of ions packets to be analyzed by a mass spectrometer will significantly improve throughput of mass spectrometry analysis. For example, sequentially packed ions may be produced from various ionization sources and may be queued and transferred to a mass spectrometer for analysis, thus increasing throughput of analyses. The present disclosure provides an ion transfer device and an ion transfer method for producing ions in a remote location and for transferring the produced ions sequentially to a mass spectrometer for analysis.

In one or more embodiments, an ion transfer device transfers ions from at least one ion inlet to at least one ion outlet of the ion transfer device, and the ion transfer device includes an enclosure configured to maintain reduced pressure; and a plurality of electrodes disposed at least in part inside the enclosure such that the ion transfer device is configured to be flexible or re-configurable.

In one or more embodiments, the ion transfer device is configured to be bent from two or more bend positions to form a plurality of curvatures while actively and efficiently transferring the ions.

In one or more embodiments, the plurality of electrodes are flexibly connected to each other to make the ion transfer device re-configurable while actively transferring the ions from a first location to a second location.

In one or more embodiments, the one or more ion transfer enclosures and one or more electrodes are flexibly attached to each other to allow the ion transfer device to transfer the ions in two or more different shapes.

In one or more embodiments, the ion transfer device is configured to be transformable between two or more different physical shapes, and the ion transfer device is configured to transfer the ions in the two or more different physical shapes from the at least one ion inlet to the at least one ion outlet.

In one or more embodiments, the reduced pressure in which an ion transfer device is maintained at is between 0.001 to 100 Torr.

In one or more embodiments, the ion transfer device is re-configurable and transformable between at least a first configuration and a second configuration such that the ion transfer device, in the first configuration, transfers ions from a first location to a second location, and the ion transfer device, in the second configuration, transfers the ions from the first location to a third location, the third location being different from the second location.

In one or more embodiments, at least two of the plurality of electrodes are configured to be flexibly attached to each other using electrically insulating material.

In one or more embodiments, a first group of electrodes include a first number of the plurality of electrodes are attached to each other in a non-flexible manner, a second group of electrodes including a second number of the plurality of electrodes are attached to each other in a non-flexible manner, and the first group of electrodes and the second group of electrodes are attached to each other in a flexible manner to allow bending of the first group of electrodes or the second group of electrodes around one or more axes with respect to each other.

In one or more embodiments, the plurality of electrodes are ring-shaped electrodes that form an elongated ion funnel structure.

In one or more embodiments, the plurality of electrodes are wires in helical form.

In one or more embodiments, the plurality of electrodes are disposed parallel to each other and are elongated along an axis of the ion transfer device.

In one or more embodiments, the plurality of electrodes are attached to an inner surface of the enclosure.

In one or more embodiments, RF voltage and DC voltage are applied to each of the plurality of electrodes, and the RF voltage and DC voltage are applied to each of the plurality of electrodes respectively via a capacitor and a resistor.

In one or more embodiments, the DC voltage is traveling DC voltage pulse.

In one or more embodiments, RF voltage applied to each of the plurality of electrodes is out of phase with the RF voltage applied to adjacent electrodes.

In one or more embodiments, the DC voltage causes the ions to move axially parallel to an axis of the ion transfer device, and the RF voltage causes the ions to move radially around the axis of the ion transfer device.

In one or more embodiments, the ion transfer device is connected to an ion source that is configured to be freely movable in 3-dimensional space to bring it in close to a sample under test to produce the ions from the sample under test.

In one or more embodiments, an ion analysis system includes at least one ion source configured to produce ions from a sample; at least one ion transfer device having an enclosure, and a plurality of electrodes disposed at least in part inside the enclosure such that the ion transfer device is configured to be flexible or re-configurable; and a main body having at least one analyzer configured to separate the ions based on mobility or mass to charge ratio; and at least one detector configured to detect the separated ions.

In one or more embodiments, a method includes producing ions from a sample; transferring the ions with at least one ion transfer device that is configured to be flexible or re-configurable, the ion transfer device having an enclosure, and a plurality of electrodes disposed at least in part inside the enclosure; separating the ions with at least one analyzer configured to separate the ions based on mobility or mass to charge ratio; and detecting the separated ions with at least one detector.

BRIEF DESCRIPTION OF DRAWINGS

Certain embodiments of the present disclosure are described with reference to the accompanying drawings. However, the accompanying drawings illustrate only certain aspects or implementations of the present disclosure by way of example and are not meant to limit the scope of the claims.

DETAILED DESCRIPTION

In general, embodiments of the present disclosure related to a flexible or re-configurable ion transfer device and methods for transferring ions with a flexible or re-configurable ion transfer device.

Specific embodiments are disclosed with reference to the accompanying drawings. In the following description, numerous details are set forth as examples of the present disclosure. It will be understood by those skilled in the art that one or more embodiments of the present disclosure may be practiced without these specific details and that numerous variations or modifications may be possible without departing from the scope of the invention. Certain details known to those of ordinary skill in the art are omitted to avoid obscuring the description.

Figure 1A:
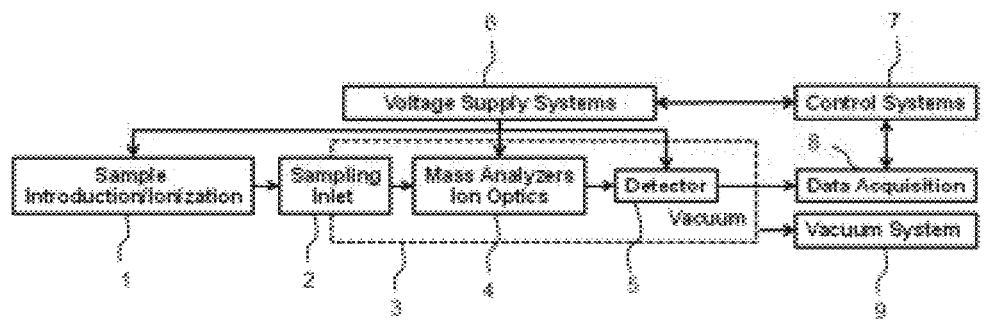
FIG. 1A shows a block diagram of a conventional mass spectrometer.
Figure 1B:
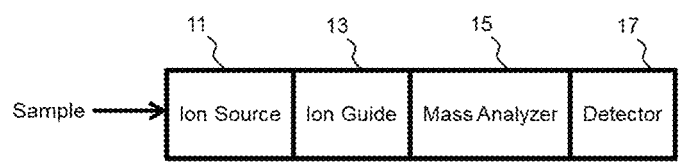
FIG. 1B shows a block diagram of a conventional mass spectrometer.
Figure 1C:
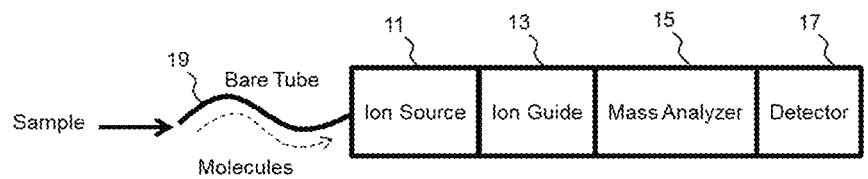
FIG. 1C shows a block diagram of a conventional mass spectrometer such that the ion source is detached from the ion guide and the ions are transferred to ion guide of a mass spectrometer via a bare tube.
Figure 1D:
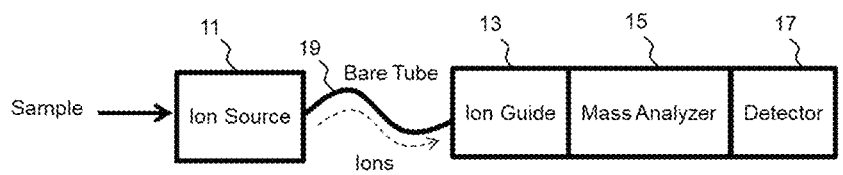
FIG. 1D shows a block diagram of a conventional mass spectrometer such that the sample is located at a distance from the ion source and the ions are transferred to ion source of a mass spectrometer via a bare tube.
Figure 2A:
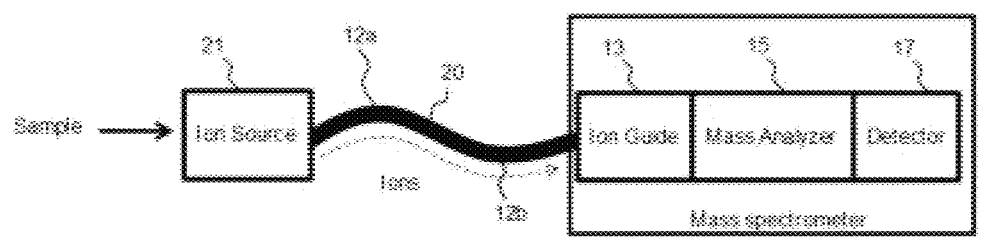
FIG. 2A shows a block diagram of a mass spectrometry system such that the ion source is detached from the ion guide and the ions are efficiently transferred to ion guide via a flexible or re-configurable ion transfer device in accordance with one or more embodiments of the present disclosure.

FIG. 2A shows a block diagram of a mass spectrometry system such that the ion source 21 is detached from the ion guide 13 and the ions are efficiently transferred to ion guide via a flexible or re-configurable ion transfer device 20 in accordance with one or more embodiments of the present disclosure. The mass spectrometry system, as disclosed herein, may include the ion source 21, the ion transfer device 20, the ion guide 13, the mass analyzer 15, the detector 17, and the corresponding vacuum systems and electronics (additional sub-systems) for proper operation and full functionality. Additional sub-systems for a mass spectrometer are shown in FIG. 1A and omitted in this and other figures of the present application to avoid obscuring the description and drawings and for maintaining simplicity of illustration. One of ordinary skill in the art, in view of the present disclosure, will understand that the mass spectrometry system includes additional sub-systems such as those shown in FIG. 1A for full functionality and operation.

In FIG. 2A, the mass spectrometry system includes an ion source 21 that is detached from an ion guide 13 of the mass spectrometry system and the ions are efficiently transferred from the ion source 21 to the ion guide 13 of the mass spectrometry system through the ion transfer device 20, which is flexible or re-configurable. The ion guide 13 may be one or more ion funnels, or one or more multipole ion guides having a plurality of even number of poles used in conventional mass spectrometers. The ion source 21 may be electrospray, plasma, glow discharge, laser, photo-ionization, or a combination of them used in ambient ionization techniques. In one or more embodiments, the ion source 21 may use any ambient ionization techniques under categories "extraction" (a solid or liquid extraction processes dynamically followed by spray or chemical ionization), "plasma" (thermal or chemical desorption with chemical ionization), "two-step" (desorption or ablation followed by ionization), "laser" (laser desorption or ablation followed by ionization), "acoustic" (acoustic desorption followed by ionization), or multimode (involving two of the above modes).

In one or more embodiments, the ion source 21 may be any of Air flow-assisted ionization, Air flow-assisted desorption electrospray ionization, Atmospheric pressure glow discharge desorption ionization, Ambient pressure pyroelectric ion source, Atmospheric pressure thermal desorption chemical ionization, Atmospheric pressure thermal desorption/ionization, Atmospheric pressure solids analysis probe, Beta electron-assisted direct chemical ionization, Charge assisted laser desorption/ionization, Desorption atmospheric pressure chemical ionization, Desorption atmospheric pressure photoionization, Direct analysis in real time, Dielectric barrier discharge ionization, Desorption corona beam ionization, Desorption chemical ionization, Desorption electroflow focusing ionization, Desorption electrospray/metastable-induced ionization, Desorption electrospray ionization, Desorption sonic spray ionization, Desorption ionization by charge exchange, Direct inlet probe-atmospheric-pressure chemical ionization, Direct probe electrospray ionization, Electrode-assisted desorption electrospray ionization, Easy ambient sonic-spray ionization, Extractive electrospray ionization, Electrospray laser desorption ionization, Electrospray-assisted pyrolysis ionization, Electrostatic spray ionization, Flowing atmospheric pressure afterglow, Field-induced droplet ionization, High-voltage-assisted laser desorption ionization, Helium atmospheric pressure glow discharge ionization, Infrared laser ablation metastable-induced chemical ionization, Jet desorption electrospray ionization, Laser assisted desorption electrospray ionization, Laser ablation electrospray ionization, Laser ablation flowing atmospheric pressure afterglow, Laser ablation inductively coupled plasma, Laser desorption atmospheric pressure chemical ionization, Laser diode thermal desorption, Laser desorption electrospray ionization, Laser desorption spray post-ionization, Laser electrospray mass spectrometry, Liquid extraction surface analysis, Laser-induced acoustic desorption-electrospray ionization, Liquid micro-junction-surface sampling probe, Leidenfrost phenomenon-assisted thermal desorption, Liquid sampling-atmospheric pressure glow discharge, Laser spray ionization, Low temperature plasma, Matrix-assisted inlet ionization, Matrix-assisted laser desorption electrospray ionization, Microfabricated glow discharge plasma, microwave induced plasma desorption ionization, Nano-spray desorption electrospray ionization, Neutral desorption extractive electrospray ionization, Plasma-assisted desorption ionization, Paint spray, Plasma-assisted laser desorption ionization, Plasma-assisted multiwavelength laser desorption ionization, Plasma-based ambient sampling/ionization/transmission, Paper assisted ultrasonic spray ionization, Probe electrospray ionization, Paper spray, Pipette tip column electrospray ionization, Radiofrequency acoustic desorption and ionization, Remote analyte sampling transport and ionization relay, Rapid evaporative ionization mass spectrometry, Robotic plasma probe ionization, Surface activated chemical ionization, Solvent-assisted inlet ionization, Surface acoustic wave nebulization, Secondary electrospray ionization, Solid probe assisted Nano-electrospray ionization, Single-particle aerosol mass spectrometry, Sponge-Spray Ionization, Surface sampling probe, Switched ferroelectric plasma ionizer, Thermal desorption-based ambient mass spectrometry, Transmission mode desorption electrospray ionization, Touch spray, Ultrasonication-assisted spray ionization, Venturi easy ambient sonic-spray ionization, Brush-Spray Ionization, or Fiber-Spray Ionization.

In one or more embodiments, re-configurable or flexible in the present disclosure is defined as the capability of being transformed between at least two different shapes or forms, or being transformed from one configuration to another configuration. In one or more embodiments, this transformation occurs and a shape or a form of the ion transfer device 20 is changed when ions are being actively transferred by the ion transfer device 20. The ion transfer device 20 may have a plurality of bend positions 12a and 12b, and the ion transfer device may form one or more curvatures around the bend positions. In one or more embodiments, the flexible or re-configurable ion transfer device 20 may hold or retain a new shape or form after changing the shape or form from an old shape to a new shape, for example, by a force applied by hands of a user or an operator. In one or more embodiments, the flexible or re-configurable ion transfer device 20 may be soft and may not retain or hold a new shape or form after changing the shape or form from an old shape to the new shape. In one or more embodiments, flexible or re-configurable in the present disclosure is defined as the capability of being bent and being able to change from an old form or shape to a new form or shape when the ion transfer device 20 is actively transferring the ions. In one or more embodiments, flexible or re-configurable may be defined as the ion transfer device 20 having a plurality of bend positions such that the ion transfer device 20 may form curvatures. In one or more embodiments, flexibility is defined as the achievable range of motion or being at a bend position or a plurality of bend positions without affecting ion transfer efficiency of the ion transfer device 20, without losing the functionality of the ion transfer device 20, or without shorting electrical connections of the ion transfer device 20. In one embodiment, flexible is defined as being capable of having a plurality of curvatures around an axis of the ion transfer device 20. In one embodiment, flexibility of the ion transfer device 20 may or may not retain a form or a shape while being flexible or re-configurable. In one or more embodiments, flexibility may be defined as spacing between electrodes of the ion transfer device 20 being increased or decreased. In one or more embodiments, being flexible and being re-configurable may be used in an interchangeable manner.

The ion transfer device 20 has a diameter and a length. The diameter may be the same or different along the ion transfer device 20. In one or more embodiments, the diameter of the ion transfer device 20 may be any value between 0.2 to 2 inches or even up to 5 inches, the length of the ion transfer device 20 may be any value between 0.5 to 1000 inches, or 1 to 500 feet. In one or more embodiments, the length may be 2, 5, 10, 100 or even 1000 times of the diameter (or the largest or the smallest diameter if the diameter varies along the length). The length is as the distance between defined the point the ion transfer device 20 is connected to the ion source 21, (or for example the ion inlet of the ion transfer device 20) and the point the ion transfer device 20 is connected to the ion guide 13 (or for example the ion outlet of the ion transfer device 20) when the ion transfer device 20 is in the form of a straight-line between these two points. The ion inlet (illustrated in drawings as "ions in") and the ion outlet (illustrated in drawings as "ions out") in the present disclosure are defined as sides of ion transfer device from which ions respectively enter and exit the ion transfer device 20.

Figure 2B:
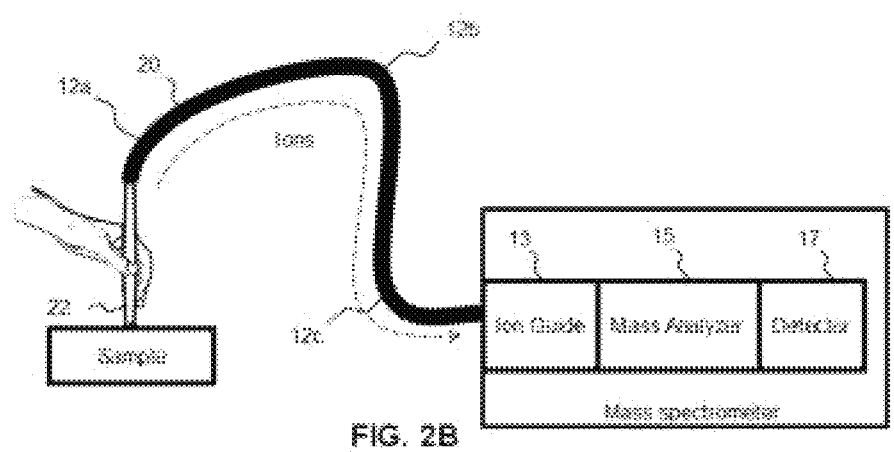
FIG. 2B shows a block diagram of a mass spectrometry system such that the ion source in form of an ion source probe is detached from the ion guide and the ions are efficiently transferred to the ion guide via a flexible or re-configurable ion transfer device in accordance with one or more embodiments of the present disclosure.

FIG. 2B shows a block diagram of a mass spectrometry system such that the ion source probe 22 is detached from the ion guide 13 and ions are efficiently transferred to ion guide 13 via a flexible or re-configurable ion transfer device 20 in accordance with one aspect of the present disclosure. The mass spectrometry system shown in FIG. 2B includes a flexible ion transfer device 20, which may efficiently transfer ions from a hand-held or portable ionization probe 22 to an ion guide 13 of a conventional mass spectrometer that also includes a mass analyzer 15 and a detector 17.

The terms "Efficient" or "efficient transfer" of ions or "efficient ion transfer," or "efficiently transferring ions" are defined in the present disclosure as the transfer of ions with no ion loss or with minimal loss. The ion loss may be caused by collisions of ions with the inner walls of the ion transfer device 20 or by colliding with structures disposed inside the ion transfer tube 20. In some embodiments, efficient ion transfer may be ion transfer with the ratio of ion exiting the ion outlet of the ion transfer device 20 to the ions entering the ion inlet of the ion transfer device 20 being greater than 0.99, 0.95, 0.90, 0.85, 0.80, 0.5, 0.2 or 0.1. In one or more embodiments, ion transfer efficiency is defined as the ratio of "the ion exiting the outlet of the ion transfer device when all required voltages for the ion transfer device operation is applied" to "the ions exiting the outlet of the ion transfer device 20 when no voltage is applied to the ion transfer device 20" being greater than, for example, 1.5, 2, 3, 10, 50, 500, 1000, or being greater than 1000 or more. In one or more embodiments, efficient may be defined as the percentage of ions exiting the outlet of the ion transfer device 20. The efficiency may be greater than 90%, 50%, or 10%. The number of ions entering the ion inlet or exiting the ion outlet of the ion transfer device 20 may be measured or quantified, for example, by monitoring ion current at the ion inlet or ion outlet of the ion transfer device 20 with ion current detector such as an ammeter, an electrometer, or an electron multiplier. In one or more embodiments, Active ion transfer or actively transferring ions in the present disclosure is defined as transfer of ions with aid of electric fields or potentials created by application of voltages to electrodes of the ion transfer device 20 or when various voltages (such as DC or RF or a combination of both) are applied to electrodes of the ion transfer device 20. Transfer or movement of ions inside the ion transfer device 20 may be under an effect of electric field, or gas flow, or a combination of both. Further, ion-ion repulsion may move ions inside the ion transfer device 20.

The pressure inside the ion transfer device may be in the range of 0.001 to 760 Torr. In this pressure regime, the ions have a relatively small mean free path, (in the order of a few nanometers to several micrometers), and therefore, collision of ions with background gas exists inside the ion transfer device 20 and when ions are being transferred or guided inside the ion transfer device 20. The collision of ions with the background gas (for example air molecules) in these pressure regimes results in ions not travelling in straight lines and frequently colliding with background gas molecules and changing path as a result of these collisions. Out of phase RF voltages (or alternating current (AC) voltages) are used in conjunction with DC voltages to efficiently guide and transfer the ions inside ion transfer device 20. RF voltages radially push ions towards a central axis of the ion transfer device 20 and maintain ions in a central portion of the ion transfer device 20, thus preventing ions from colliding with inner walls and being lost. While RF voltages and the resulting electric field from RF voltages retain ions in a central portion of the ion transfer device 20 (for example along a longitudinal axis of the ion transfer device 20), the DC voltage may provide a gradient to transfer and guide the ions in a direction towards ion outlet of the ion transfer device 20.

The ion transfer device 20 may be in a shape of a flexible tube or a flexible bellow with a plurality of electrodes disposed inside the flexible tube or bellow to receive the ions from an ion inlet of the ion transfer tube 20 from an ionization source, such as the hand-held ionization probe 22, and then actively transfer the ions to an ion outlet of the ion transfer device 20, where ions then enter the ion guide 13 of the mass spectrometer.

It is noted that although the present disclosure mainly describes use of a mass spectrometer to describe operation of the ion transfer device 20, however, one of ordinary skill in the art will recognize and understand that the present disclosure may also relate to an ion mobility spectrometer or any other apparatus that transfers gas phase ions. Ions in the present disclosure are defined as charged particles, having positive or negative charges. Therefore, all the examples in which a mass spectrometer is described may be similarly applied to an ion mobility spectrometer, or any other apparatus using an ions or electrons, or any charged particles. In one or more embodiments, ions are atoms or molecules with a net electric charge due to the loss or gain of one or more electrons, and the atoms or molecules may be the same or different.

The ion transfer device 20 may include a tube made from a single part such as a plastic or metal tube or made from multiple tubes that are connected to each other. One or more layers of tubes may be used to provide vacuum-tightness and also for housing wires, capacitors, resistors and electrodes in between different layers of tubing. The plastic tube may be a heat-shrink tube. Heat-shrink tube may be made of any one of thermoplastics, including polyolefin, polyvinyl chloride (PVC), Viton® (for high-temp and corrosive environments), Neoprene®, polytetrafluoroethylene (PTFE), fluorinated ethylene propylene (FEP) and Kynar®. In addition to these polymers, some types of special-application heat-shrink may also include an adhesive lining that may help to bond the tubing to underlying electrodes and connectors, forming strong seals that may be waterproof or gas-tight sufficient to maintain the required pressure inside the ion transfer tube 20. In one embodiment, the heat-shrink tubing may have conductive polymer thick film to provides electrical connections between the two or more electrodes without the need to soldering, to shield the electromagnetic field produced by the RF voltages of the ion transfer device 20.

The sample, as shown in FIG. 2B, may be any arbitrary sample under analysis or test, which the ion source probe 22 produces ions from, such as a biological sample, a human or animal tissue, or any sample of interest that includes trace amounts of analyte of interest, or a geological sample. The sample may be a human body part for example a human hand, for example, being screen for skin cancer. The ion transfer device 20 may have a plurality of bend positions 12a, 12b, 12c.

Figure 2C:
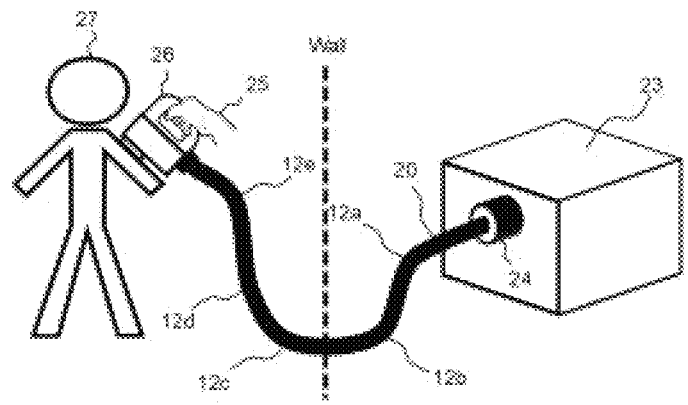
FIG. 2C shows a block diagram of a mass spectrometry system such that the ion source is detached from the mass spectrometer and the ions produced in an ionization probe are efficiently transferred to the mass spectrometer via a flexible or re-configurable ion transfer device in accordance with one or more embodiments of the present disclosure.

FIG. 2C shows a block diagram of a conventional mass spectrometer 23 such that the ion source is detached from the mass spectrometer and the ions produced in an ionization probe 26 are transferred to the mass spectrometer 23 via a flexible or re-configurable ion transfer device 20 in accordance with embodiments of the present disclosure. A conventional mass spectrometer 23 is used and the ionization source of the mass spectrometer (which is directly attached to the mass spectrometer 23 in place of an adapter 24) is replaced with an ion transfer device 20 including the adapter 24 on one end (on the ion outlet side) that is connected to the mass spectrometer 23 and an ionization probe 26 at the other end of the ion transfer device 20 (on the ion inlet side). In one embodiment, the adapter 24, the ion transfer device 20, and the ionization probe 26 replaces conventional ion source assemblies provided by mass spectrometer manufacturers (not shown—normally connected where the adapter 24 is connected in FIG. 2C) of the mass spectrometer 23. This configuration allows using an ionization probe 26 that can be extended to a distance, for example in a range from 0.1 to 10 m depending on a length of the ion transfer device 20, from the mass spectrometer 23, thus enabling easy scanning and analysis of different areas of an object under test 27.

The ion transfer device 20 efficiently transfers the ions produced by the ionization probe 26 to the mass spectrometer 23. The flexible or re-configurable ion transfer device 20 is connected to the mass spectrometer 23 with the adapter 24 that is designed to fit the ionization source inlet of the mass spectrometer 23 (where the adapter 24 is connected in FIG. 2C). The ionization probe 26 may be an ambient ionization source, atmospheric pressure ionization source, or a reduced pressure ionization source, which is hand-held, which may be easily held with a hand 25 of an operator and moved freely to different locations or parts of an object under test 27. For example, the ionization probe 26 may be freely moved to different parts of a human body so that the ionization probe 26 may become in contact with skin of different parts such as hand or leg of a person 27 so that the ionization probe 26 may produce ions from human skin that is transferred to the mass spectrometer 23 by the ion transfer device 20 for analysis by the mass spectrometer 23.

The flexibility of the ion transfer device 20 enables using a hand-held ionization probe 26 and provides several advantages not available in conventional mass spectrometers, thus extending the use of such mass spectrometry systems to many new applications. Because conventional mass spectrometers are bulky and because ionization sources in conventional mass spectrometers are directly attached to the mass spectrometer, therefore, in order to analyze human skin with conventional mass spectrometers, the human must move and bring various body parts directly in front of a conventional mass spectrometer. That can be difficult, impractical, or impossible. The flexible ion transfer device 20, as disclosed herein, makes it possible for the ionization probe 26 to flexibly and freely move to different body part located away from the mass spectrometer 23. This enables using conventional mass spectrometers in new applications, such as hospitals and medical offices, for example, for real-time skin analyses by replacing the conventional ion sources with the ionization probe 26 which is connected to the mass spectrometer 23 via the flexible ion transfer device 20. Therefore, the mass spectrometer 23 may be located far from the place where the sampling/ionization is taking place by the ion source probe 26. For example, the mass spectrometer 23 may be placed in a separate room and the ion transfer device 20 may transfer the ions using the ion transfer device 20 that is passed through a wall that separates the mass spectrometer 23 from the object under test 27. Further, this approach enables efficient transfer of ions to the mass spectrometer 23 without or with minimal ion loss, resulting in increased analytical performance, such as increased detection limits and sensitivities required for many applications such as in situ human tissue analysis. In other words, the ion transfer device 20 enables extending the ion source 26 of the mass spectrometer 23 away from a mass spectrometer to enable sample analysis from objects 27 that are difficult to bring close to the mass spectrometer 23. The object under test 27 may be a patient that is going through surgery on a hospital bed. The ion transfer device 20 may have a plurality of bend positions 12a, 12b, 12c, 12d, 12e around which the ion transfer device 20 may form a plurality of curvatures.

Figure 2D:
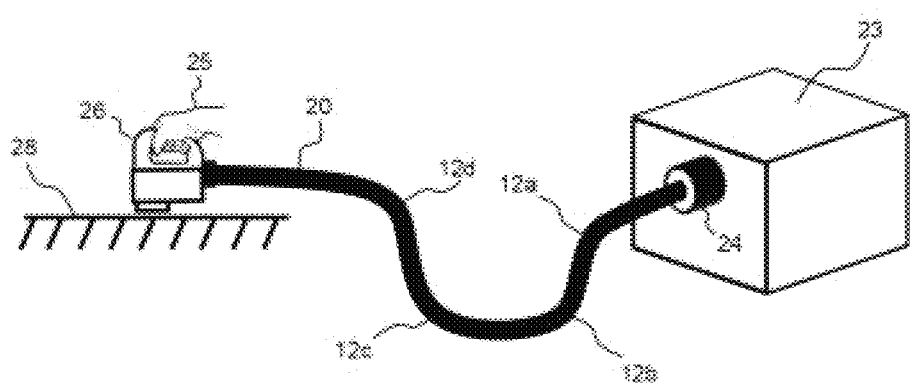
FIG. 2D shows a block diagram of a mass spectrometer such that the ion source is detached from the mass spectrometer and the ions produced in an ionization probe are efficiently transferred to the mass spectrometer via a flexible or re-configurable ion transfer device in accordance with one or more embodiments of the present disclosure.

FIG. 2D shows a block diagram of a mass spectrometer 23 such that the ion source is detached from the mass spectrometer and the ions produced in an ionization probe 26 are transferred to the mass spectrometer 23 via a re-configurable ion transfer device 20 in accordance with one or more embodiments of the present disclosure. The ionization probe 26 may be held by a hand 25 of an operator or a user (or for example by a robotic arm of a robot) and a surface of interest 28 may be analyzed without having the mass spectrometer 23 close to the surface of interest 28. The length of the ion transfer device 20 may be greater than 10 cm, 50 cm, 100 cm, 150 cm, or 200 cm. In other embodiments, the length of the ion transfer device 20 may be greater than 2 meters, 5 meter, or 10 meter, or more.

The ionization probe 26 produces ions from the surface of interest 28 and the produced ions are transferred via the ion transfer device 20 to the mass spectrometer 23 for analysis. As noted above, this enables modifying the conventional mass spectrometer 23 by replacing the original ion source (not shown) of the conventional mass spectrometer 23 by an adapter 24 that connects the ion transfer device 20 to the mass spectrometer 23 and efficiently transfers the ions from the ion transfer device 20 to the mass spectrometer 23. This allows use of ionization probes 26 that may be freely moved around to scan one or more surfaces of interest 28. For example, at an airport, this ionization probe may be used by a security office at a check point to scan for traces of explosive materials on passengers, cargo, or luggage. In a rover for planetary exploration in space application, such a configuration enables placing the ion source 26 on a robotic arm and placing the mass spectrometer 23 on a body of the rover. The ion source 26 may be used in a manufacturing line to monitor for the quality or contamination of produced products, such as pharmaceutical products in the production line with one or more ionization sources 26 connected with one or more ion transfer devices 20 to one or more mass spectrometers 23. The ion transfer device 20 may have a plurality of bend positions 12a, 12b, 12c, 12d around which the ion transfer device 20 may form curvatures.

Figure 2E:
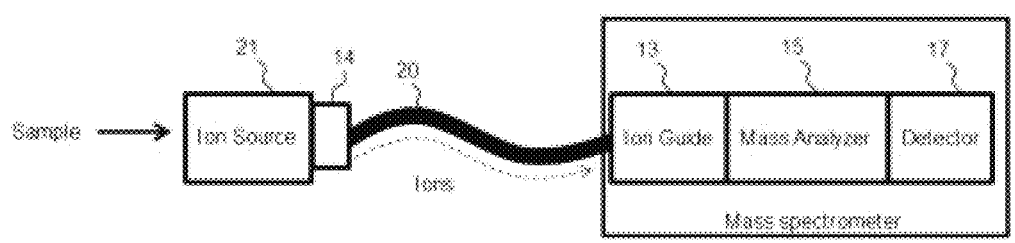
FIG. 2E shows a block diagram of a mass spectrometry system such that the ion source is detached from the ion guide and the ions are efficiently transferred to ion guide via a flexible or re-configurable ion transfer device in accordance with one or more embodiments of the present disclosure.
Figure 2F:
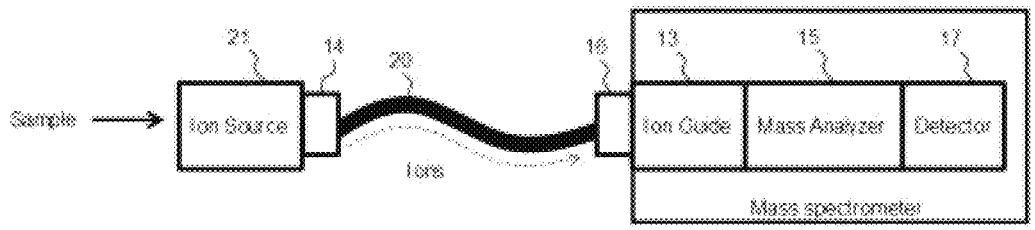
FIG. 2F shows a block diagram of a mass spectrometry system such that the ion source is detached from the ion guide and the ions are efficiently transferred to ion guide via a flexible or re-configurable ion transfer device in accordance with one or more embodiments of the present disclosure.

FIG. 2E and FIG. 2F show two block diagrams of a mass spectrometry system such that the ion source 21 is detached from the ion guide 13 and the ions are transferred to ion guide 13 via a re-configurable ion transfer device 20 in accordance with one or more embodiments of the present disclosure. The flexible ion transfer device 20 may have an adapter 14 (including one or more electrodes such as skimmer and sample cones disposed inside, or conventional ion funnels and ion guides) that connects to the ionization probe 21 and efficiently transfers ions from the ionization probe 21 to the flexible ion transfer device 20. The adapter 14 may also include the electronics necessary to operate the ion transfer device 20, including direct current (DC), alternating current (AC), or radio frequency (RF) voltages for operation of the ion transfer device 20. In one embodiment, the ion transfer device 20 may be connected to a second adapter 16 that connects the ion transfer device 20 to an ion guide 13 of a mass spectrometer. The second adapter 16 may be used to attach the ion transfer device 20 to the mass spectrometer in a vacuum-tight manner while efficiently transferring the ions from the ion transfer device 20 to the mass spectrometer. The second adapter 16 may include electronics necessary to operate the ion transfer device 20 (such as RF and DC voltage power supplies and the related control unit for controlling the power supplies) or may include one or more electrodes floated at a voltage (such as skimmer and sample cones, or one or more conventional ion funnels) for efficient transfer and extraction of ions from the ion outlet of the ion transfer device 20 to the ion guide 13 of the mass spectrometer. The first adapter 14 or the second adapter 16 may include electronics and other components necessary to operate the ionization source 21, for example, connectors, electronics for plasma ionization, liquid reservoir for electrospray ionization or laser modules with fiber optics that may be attached to the outer diameter or may be implemented along the ion transfer device 20 for laser desorption/ionization, or a combination of them. Related wires and optical fibers may be attached to the ion transfer device 20 to reach the ionization source 21 from the mass spectrometer or the adapter 16. This is advantageous for reducing the weight and size of the ion source 21 that may be an ionization probe 26 used by an operator, which require reduced weight for easy handling by the operator.

Figure 3A:
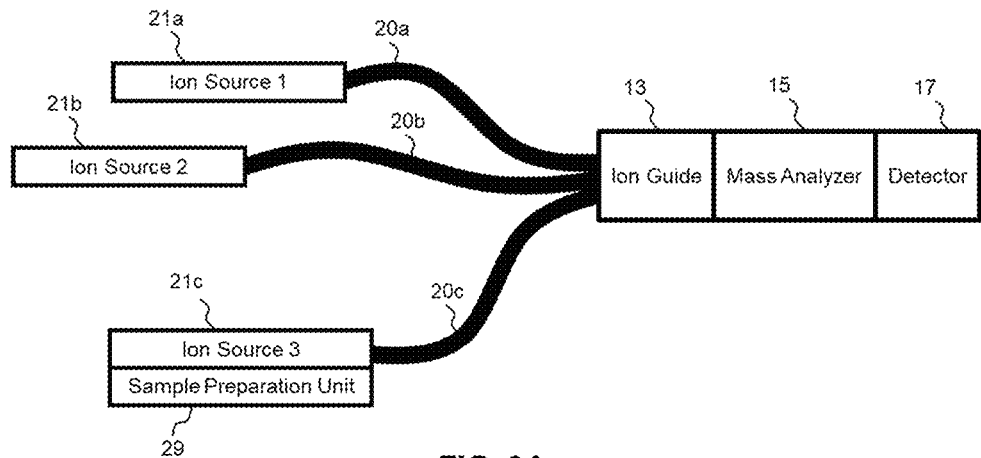
FIG. 3A shows a block diagram of a mass spectrometry system such that three different ion sources are attached to mass spectrometry system via flexible or re-configurable ion transfer devices in accordance with one or more embodiments of the present disclosure.

FIG. 3A shows a block diagram of a mass spectrometry system such that the three ion sources 21a-c are attached to a mass spectrometer via a re-configurable ion transfer device 20 in accordance with one or more embodiments of the present disclosure. Three ionization sources 21a-c, which may be different or the same located at three different locations, are connected to an ion guide 13 of a mass spectrometer. The ionization sources 21a, 21b, 21c may be different or the same. One or more ionization sources 21a, 21b, 21c may be connected to one or more sample preparation devices 29 to prepare the samples for ionization. For example, the ionization sources 21a, 21b, 21c may be connected one or more sample preparation or separation instruments, such as a high-pressure liquid chromatography system (LC or HPLC system) or a gas chromatography (GC) system to separate analytes before analysis with the mass spectrometer. The ion sources 21a, 21b, 21c are operated in a multiplexed manner and each ion source has a periodic allocated time frame to introduce ions into the mass spectrometer via the corresponding ion transfer tube that is attached to the ion source for analysis. In the present disclosure, the combination of the ion guide 13 the mass analyzer 15 and the detector 17 may be referred as the mass spectrometer. This configuration provides the advantage that a single mass spectrometer may be used to analyze different sample located in different places and coming from different separation or sample preparation instruments as described above. Because analysis by a mass spectrometer is performed in milliseconds to seconds, thus such multiplexing greatly enhances optimal use of mass spectrometers by continuously and sequentially providing ions from different locations/instruments or ionization sources 21a, 21b, 21c to the mass spectrometer for analysis.

Figure 3B:
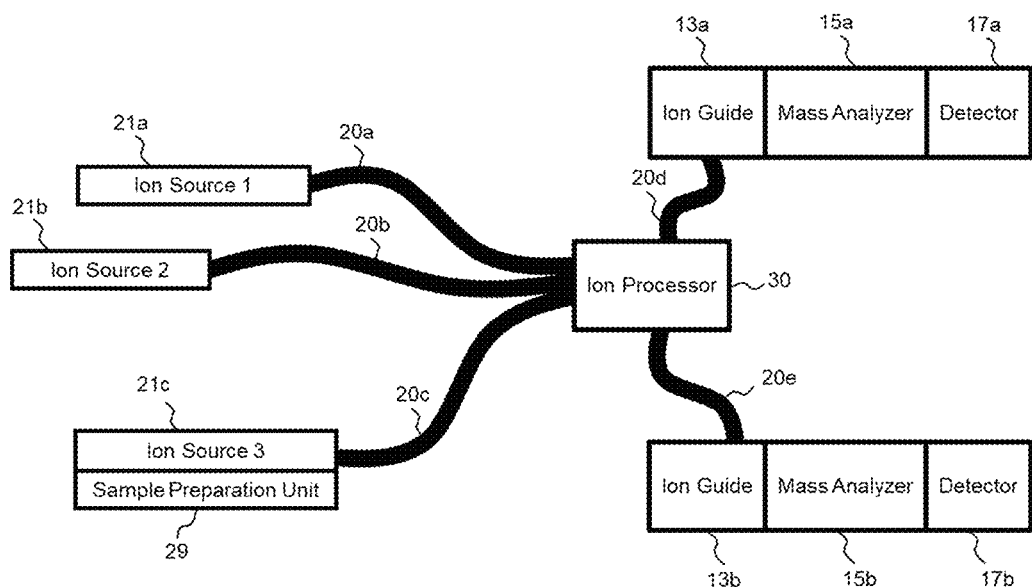
FIG. 3B shows a block diagram of a mass spectrometry system such that three different ion sources are efficiently transfer ions to two different mass spectrometry systems via flexible or re-configurable ion transfer devices in accordance with one or more embodiments of the present disclosure.

FIG. 3B shows a block diagram of a mass spectrometry system such that the three ion sources 21a-21c are attached to two mass spectrometers via re-configurable ion transfer devices 20a-e in accordance with one or more embodiments of the present disclosure. The ion processor 30 (also referred to as the ion manipulation device in the present disclosure, an example of which is described in U.S. Pat. No. 9,966,244 for lossless ion manipulation (SLIM)) may be used to selectively transfer the ions received from three ionization source 21a, 21b, 21c respectively connected to three flexible ion transfer devices 20a, 20b, 20c to the ion processor 30. The ion processor 30 then selectively transfers the ions via two flexible ion transfer devices 20d, 20e to two different mass spectrometers: the first mass spectrometer including the ion guide 13a, the mass analyzer 15a and the detector 17a, and the second one including the ion guide 13b, the mass analyzer 15b and the detector 17b, as shown in FIG. 3B. The ion processor 30 may trap, store, process (for example separate ions based on their mobility), and selectively transfers ion packets into these two mass spectrometers.

Figure 4A:
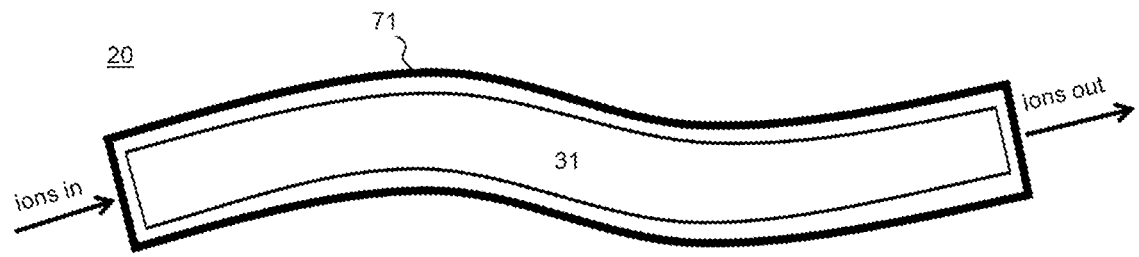
FIG. 4A, FIG. 4B, FIG. 4C, and FIG. 4D show block diagrams of different configurations for ion transfer devices in accordance with one or more embodiments of the present disclosure.

FIG. 4A shows a block diagram of an ion transfer device 20 in accordance with one or more embodiments of the present disclosure. The ion transfer device 20 may include an electrode unit 31 (each electrode unit may compromise one or more independent conductive electrodes as disclosed in the present application) connected to one or more voltages. The ion transfer device 20 may include an ion transfer enclosure 71. The ion transfer enclosure 71 may be a tube made from plastic or metal connected to a voltage or ground in case the tube is made from metal or conductive plastic. The enclosure 71 may be a plurality of tubes. The tube may be corrugated or in bellow form to allow flexible bending of the tube and the ion transfer device 20 to produce a plurality of curvatures. The tube may be constructed from one or more heat-shrink tubes. The ion transfer enclosure 71 (or simply referred to as the enclosure) maintains the one or more electrode units 31 in reduced pressure (or intermediate pressure below 760 Torr) and also provides a mechanical structure to support the electrode unit 31. The pressure level inside the enclosure 71 may be maintained between in a range from 0.0001 Torr to 750 Torr, for example in a range from 0.1 to 10 Torr. A vacuum pump may be connected to the enclosure 71 as with a T connector with an ion inlet (shown as ions in) and an ion source, with a T connector at an ion outlet (shown as ions out) or one or more locations in between the ion inlet or the ion outlet along the enclosure 71, for example, in a middle portion of the enclosure 71. The pressure inside the ion transfer device 20 may be the same or different at different locations inside the enclosure 71 along the ion transfer device 20. The pressure inside the enclosure may be in a range from 0.01 to 30 Torr. The electrode unit 31 may be flexible for flexible bending along with the ion transfer enclosure 71. The ion transfer device 20 may include one electrode unit 31 having two or more electrodes, which may be flexible electrodes, such as those shown, and described later in the present application, for example, in FIG. 14A, FIG. 14B, FIG. 14C, FIG. 15A, FIG. 15B, FIG. 15C, and FIG. 16. In other embodiments, the one electrode unit includes a plurality of electrodes that are flexibly connected to each other or the enclosure 71, examples of which are shown in FIG. 6A, FIG. 6B, FIG. 6C, and FIG. 6D described later in the present application. The enclosure 71 may be bent to have two or more different shapes or forms to have a plurality of curvatures (which may also be referred to as a plurality of twists, arcs, or curves).

Figure 4B:
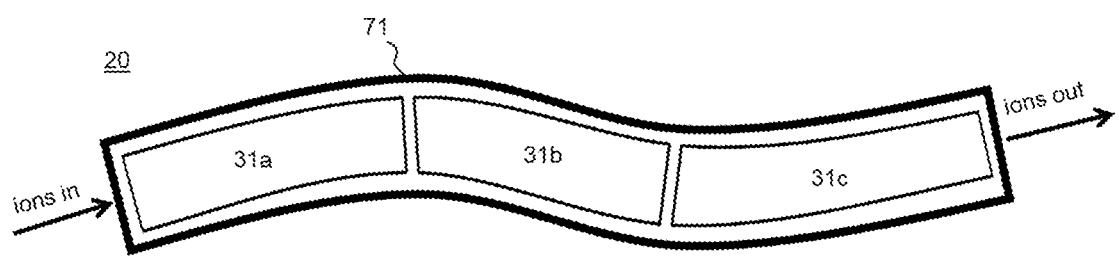
Figure 4C:
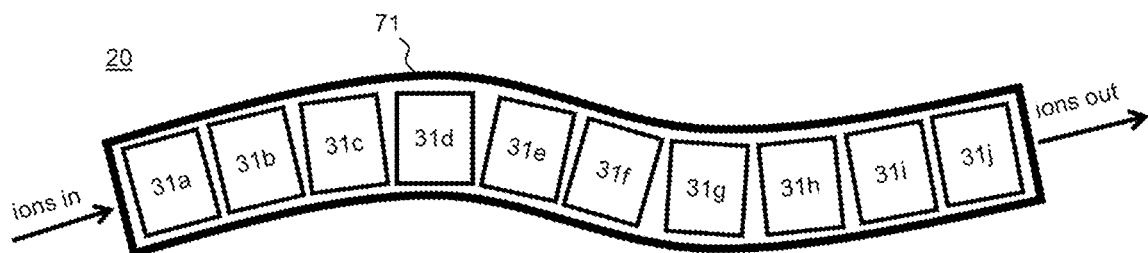

FIG. 4B and FIG. 4C show two block diagrams of embodiments of the ion transfer device 20 in accordance with one or more embodiments of the present disclosure. The ion transfer device 20 may include a plurality of electrode units 31a-c in FIG. 4B or 31a-j in FIG. 4C that are connected to each other. Each of the plurality of electrode units 31a-j may comprise a plurality of electrodes, which may be flexible electrodes, such as those shown, and described later in the present application, for example, in FIG. 14A, FIG. 14B, FIG. 14C, FIG. 15A, FIG. 15B, FIG. 15C, and FIG. 16. In other embodiments, the ion transfer device 20 may include a plurality of electrodes that are flexibly connected to each other or the enclosure 71, examples of which are shown in FIG. 6A, FIG. 6B, FIG. 6C, and FIG. 6D described later in the present application. The plurality of electrode units 31a-j and the enclosure 71 may be flexible or bendable or reconfigurable from a first shape or configuration to a second shape or configuration. In one or more embodiments, the plurality of electrode units 31a-j may be not flexible or re-configurable but flexibly connected to each other, such as those shown in FIG. 7A, FIG. 7B, FIG. 11B, FIG. 11C, FIG. 12A, FIG. 12B, and FIG. 13.

Figure 4D:
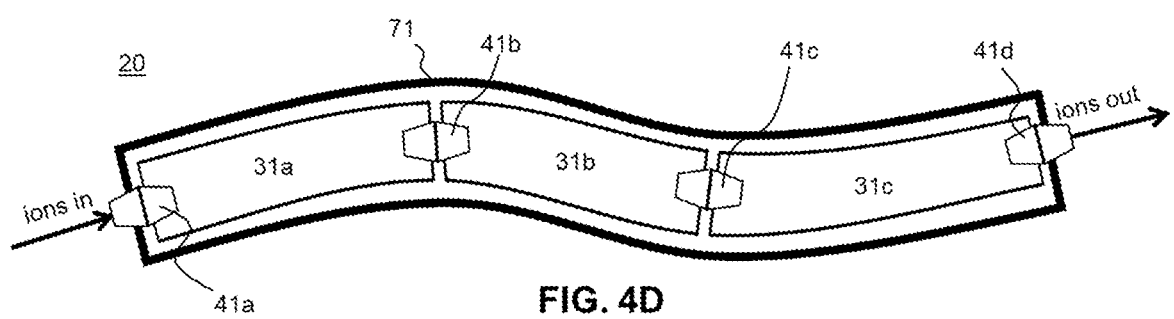

FIG. 4D shows a block diagram of an ion transfer device in accordance with one aspect of the present disclosure. In one embodiment, a plurality of connecting electrodes segments 41a-d, which are electrically isolated from the plurality of electrode units 31a-j, and may be individually connected to different voltages, connect the plurality of electrode units 31a-c. In one embodiment, the plurality of connecting electrodes segments 41a-d may ensure efficient transfer of ions between two neighboring electrode units (31a and 31b) or (31b and 31c). The plurality of connecting electrodes segments 41a-d may be in form of skimmer cones or conductance limiting orifices and similar structures used in differential pumping in conventional mass spectrometers. In other embodiments, the plurality of connecting electrodes segments 41a-d, may be one or more conductance limiting orifices or a plurality of capillary tubes.

Figure 5A:
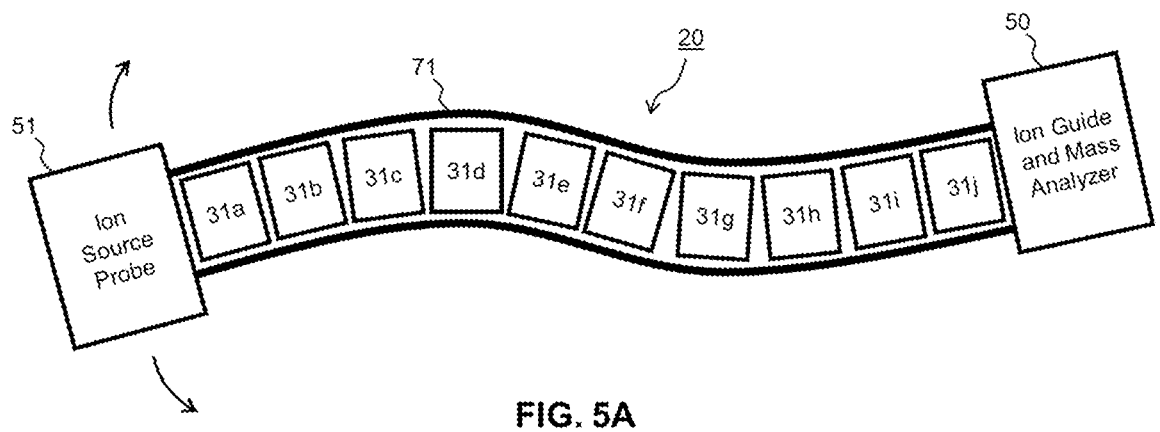
FIG. 5A, FIG. 5B, and FIG. 5C show block diagrams of different configurations of ion transfer device in accordance with one or more embodiments of the present disclosure.
Figure 5B:
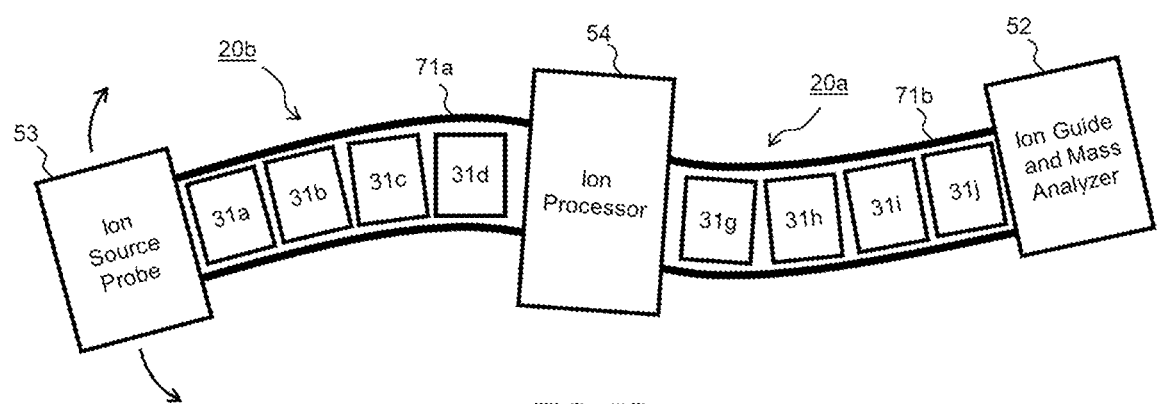
Figure 5C:
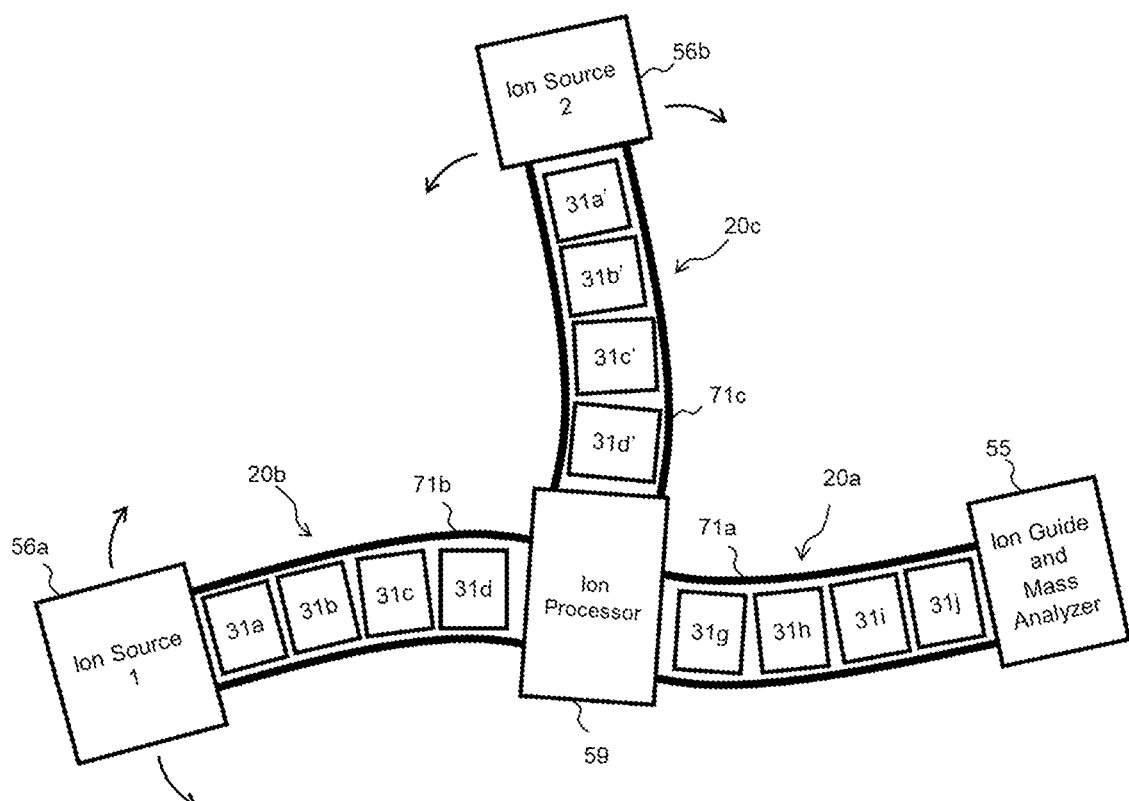

FIG. 5A, FIG. 5B, and FIG. 5C show three block diagrams of different embodiments of the ion transfer device 20 connections to the mass spectrometers 50, 52, 55 in accordance with one or more embodiments of the present disclosure. The ion transfer device 20 may include a plurality of electrode units 31a-j, as described above, that are connected to each other. Each of the plurality of electrode units 31a-j may be flexible or may be rigid and flexibly connected to each other, as described above, and are located inside the enclosure 71. The plurality of electrode units 31a-j and the enclosure 71 may be bent to have two or more different shapes or forms and may be reconfigurable or flexible. The ion transfer device 20 may be connected at one end to the ion source probe 51 that may freely move in 3-dimensional space because of the flexibility of the ion transfer device 20. The ion source probe 51 may be flexibly moved around to bring the ion source probe 51 close to sample or object under test to be analyzed. Further, the ion transfer device 20 may be connected to ion guide and mass analyzer of a mass spectrometer 50.

In one embodiment shown in FIG. 5B, an ion processor 54 may be included and the ion processor (as describes above regarding U.S. Pat. No. 9,966,244) may be connected to the ion source probe 53 on one end and the mass spectrometer 52 on the other end using two different ion transfer devices 20a and 20b so that flow or pre-separation of ions (based on their ion mobility in the ion processor 54) may be controlled. FIG. 5C is similar to FIG. 5B with the difference that the ion processor 59 is connected to two different ion sources 56a, 56b, and multiplexes the ions received from these two ion sources to the mass spectrometer 55.

Figure 6A:
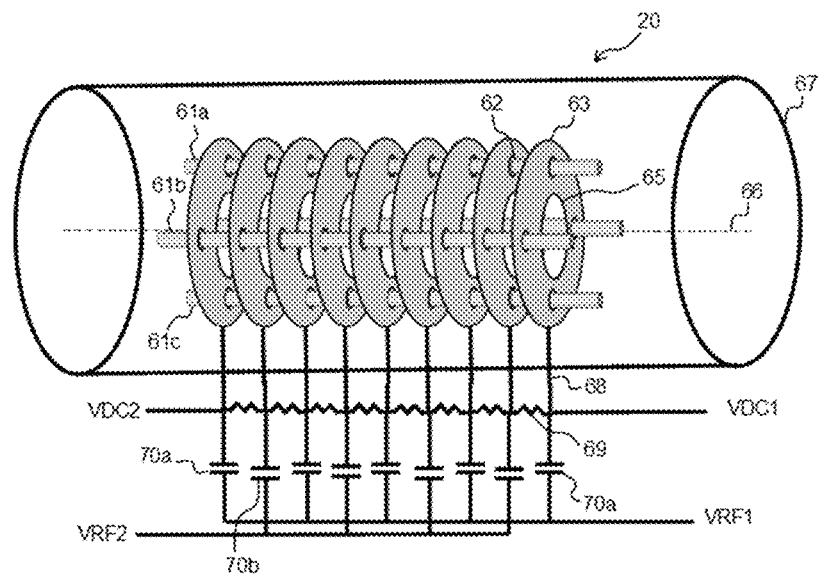
FIG. 6A, FIG. 6B, FIG. 6C, and FIG. 6D show perspective views of flexible or re-configurable ion transfer device in accordance with one or more embodiments of the present disclosure.
Figure 6B:
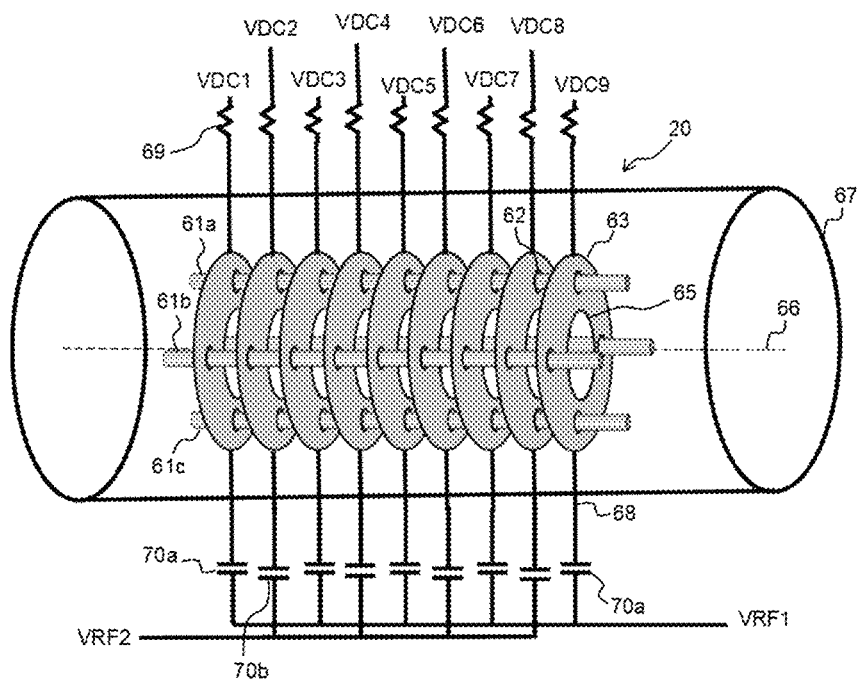
Figure 6C:
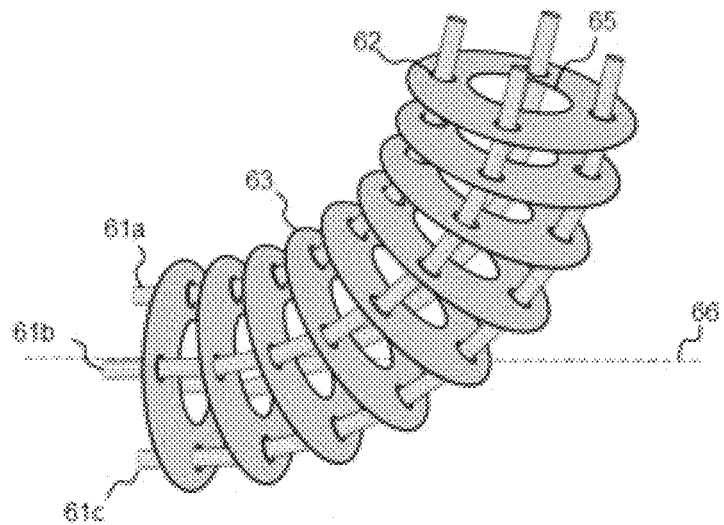
Figure 6D:
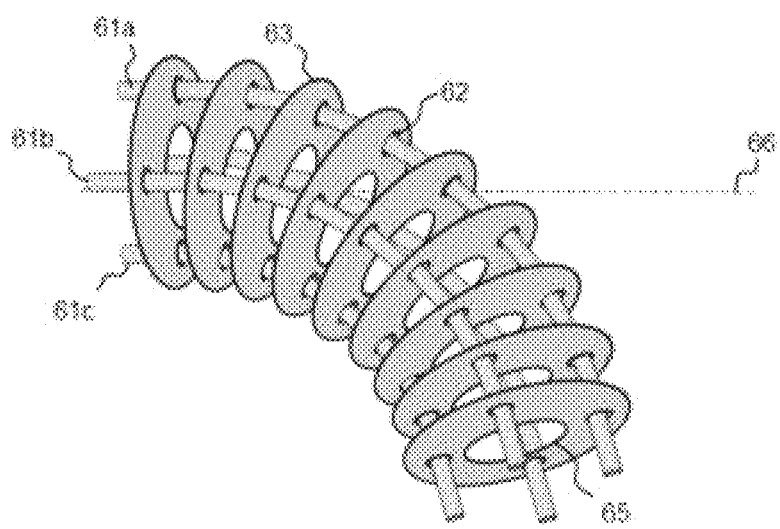

FIG. 6A, FIG. 6B, FIG. 6C, and FIG. 6D show perspective views of an embodiment of the flexible or re-configurable ion transfer device 20 in accordance with one or more embodiments of the present disclosure. In one or more embodiments, the plurality of electrodes 63 each having a central hole 65 (of the same or different diameter, in one embodiment ascending or descending diameters, which may also act as conductance limiting orifice to limit gas flow between two adjacent electrode units and provide differential pressure in two adjacent electrode units) may be connected to each other using flexible or elastic rods 61a-d, which go through a plurality of holes 62 provided on each of the plurality of the electrodes 63. The plurality of electrodes 63 are disposed inside a flexible tube or enclosure 67. (The tube or enclosure 67 is not shown in FIG. 6C, FIG. 6D, FIG. 7A, and FIG. 7B for simplicity of illustration). This configuration allows the plurality of the electrodes to form one or more curvatures around an axis 66 of the ion transfer device 20, as shown in FIG. 6C and FIG. 6D. The plurality of electrodes 63 each may have one or more electrical connection 68 to apply different voltages, such as RF voltages VRF1 and VRF2, and DC voltages, VDC1 and VDC2. The plurality of electrodes 63 may be made from any metal (stainless steel, nickel, copper, gold, or any other metal with or without coatings) or any conductive material such as conductive plastic. The spacing between the electrodes may be different or may be the same and may be a value between 0.1 mm to 10 mm. The thickness of electrodes may be different or may be the same and may be a value between 0.01 mm to 5 mm.

RF voltages may be applied by connecting a plurality of capacitors 70a, 70b in series to the electrical connections 68, which are connected to electrodes 63, as shown in FIG. 6A and FIG. 6B. The capacitors 70a, 70b may have a value of 1 to 1000 pF. The DC voltages may be applied by connecting resistors in series with the electrical connections 68, as shown in FIG. 6A. The resistor value may be 0.01M to 10M Ohms.

Figure 8A:
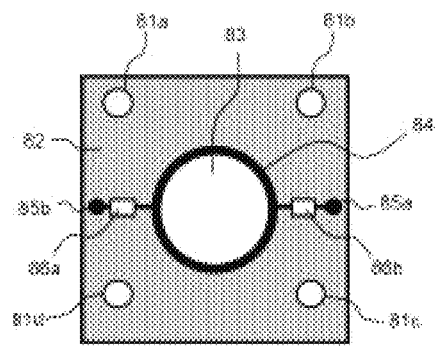
FIG. 8A, FIG. 8B, and FIG. 8C show front views of electrodes of flexible or re-configurable ion transfer device in accordance with one or more embodiments of the present disclosure.
Figure 8B:
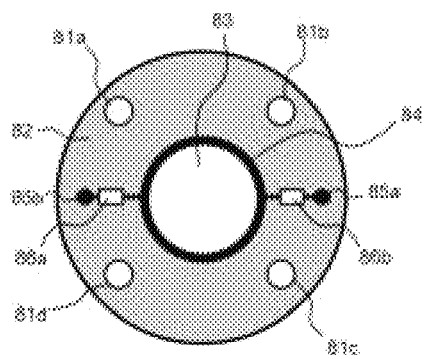
Figure 8C:
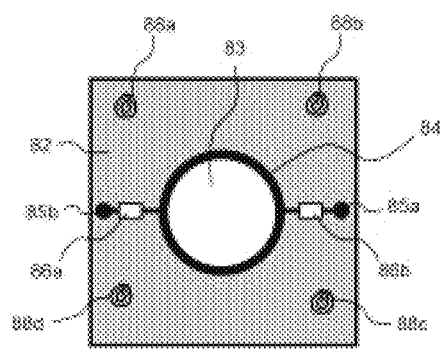

The capacitors and resistors may be connected by connectors, soldering, or spot-welding to the electrodes 63 or the electrical connections 68 instead of using the electrical connections 68. Alternatively, the capacitors 70$a$, 70$b$ and resistors 69 may be assembled on a separate flexible or rigid printed circuit board (PCB) and connected to the electrodes, as shown in FIG. 8A, FIG. 8B, and FIG. 8C as described later in the present application.

Application of DC voltage may be to the first and last electrodes of the plurality of electrodes 63, as shown in FIG. 6A by annotations VDC1 and VDC2. In one embodiment shown in FIG. 6B, each electrode of the plurality of electrodes 63 is connected to a separate controllable and addressable DC voltage (VDC1 to VDC9) to provide different voltages to each of the plurality of electrodes 63. The DC voltage may be any value from 1 to 500 volts or greater than 500V. The RF voltages may be applied as two out of phase RF voltages respectively connected to odd and even electrodes (VRF1 and VRF2). The amplitude of the RF voltage may be any value from 1 to 500 volts or greater than 500V. The frequency of the RF voltage may be any frequency from 50 KHz to 20 MHz. Preferably the RF and DC voltages should not cause gas breakdown at the pressure that the ion transfer device 20 is operating at.

Figure 9A:
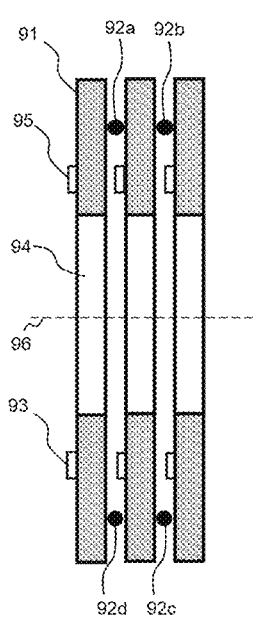
FIG. 9A, FIG. 9B, FIG. 9C, FIG. 9D, and FIG. 9E show cross-section views of electrodes of flexible or re-configurable ion transfer device connected to each other in accordance with one or more embodiments of the present disclosure.
Figure 9B:
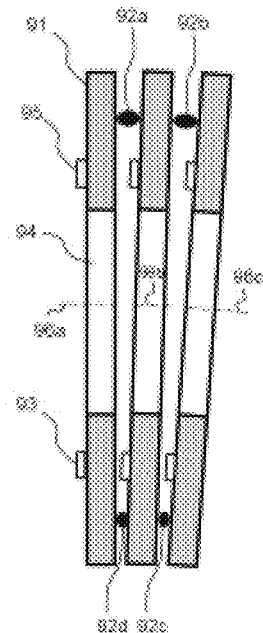

In one or more embodiments, the plurality of electrodes 63 are connected to each other as shown in FIG. 6A but instead of using the flexible or elastic rods 61$a$-$d$, a plurality of electrically insulating structures (for example elastic or rigid Viton or PTFE O-rings or any similar material) are placed in between each two electrodes of the plurality of electrodes 63 (similar to the electrically insulating structures shown by annotations 92$a$-$d$ in FIG. 9A and FIG. 9B). Each of the electrically insulating structures, such as each O-ring, may be glued to one side of each electrode 63 to hold the electrically insulating structures in place. This helps in prevent the electrically insulating structures from moving or being exposed to the ions passing through the ion transfer device 20, which may create charging problems if they end up on dielectric materials. In the flexible ion transfer device 20, the electrically insulating structures are preferably not exposed to the ions to avoid charging effects, which results from accumulation of charged particles on the electrically insulating structures, and may reform the shape of electric fields, and therefore ion trajectories. Therefore, the inner diameters of the electrically insulating structures are larger than the diameter of the holes 65, 72, 83 or 94) so that if charge accumulation occurs (for example on the electrically insulating structures shown by annotations 92$a$-$d$ in FIG. 9A and FIG. 9B), the charge accumulation do not adversely affect the electric fields inside the ion transfer device 20. In one embodiment, the resistors and capacitors are directly connected to the electrodes 63 without the electrical connections 68, similar to those shown in FIG. 8A, FIG. 8B, and FIG. 8C and the corresponding description later in this application.

Figure 9C:
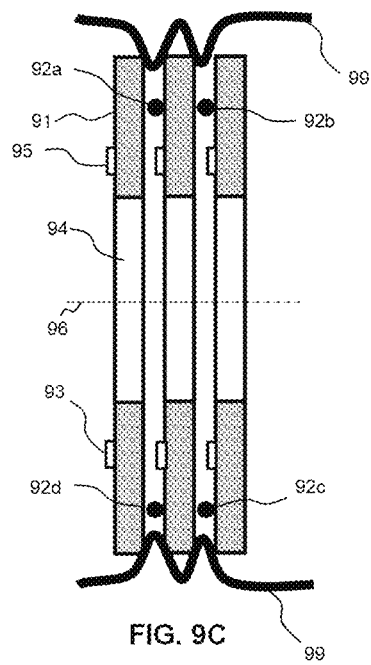

To assemble the structure, the plurality of electrodes 63 and the electrically insulating structures may be assembled on a cylindrical holder (not shown), and then upon assembly of the electrodes and connecting the necessary electrical connections and components (resistors and capacitors), the assembly may be inserted into a heat-shrink tube (which is shown by annotation 67 in one or more embodiments) so that by application of heat, the heat-shrink tube 67 to shrink and hold the assembly in place. Then, the cylindrical holder may be removed. Such an assembly with heat-shrink tube holds the electrodes firmly in place and also provides flexibility and re-configurability. Further, using heat-shrink tubing may eliminate the need for having electrically insulating structures (for example annotations 92$a$-$d$ in FIG. 9C) in between the electrodes to keep the electrodes separate as the heat-shrink, upon application of heat and shrinking, holds the electrodes in place and acts like electrically insulating structures to make the electrodes in place while providing the flexibility as disclosed in the present application, as shown in FIG. 9C, in which the heat-shrink tube shrink into the area in between two adjacent electrodes 91.

Figure 7A:
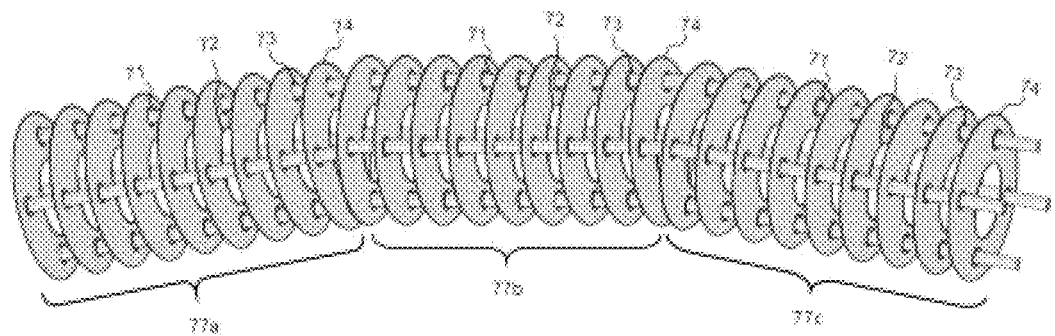
FIG. 7A and FIG. 7B show perspective views of flexible or re-configurable ion transfer device in accordance with one or more embodiments of the present disclosure.
Figure 7B:
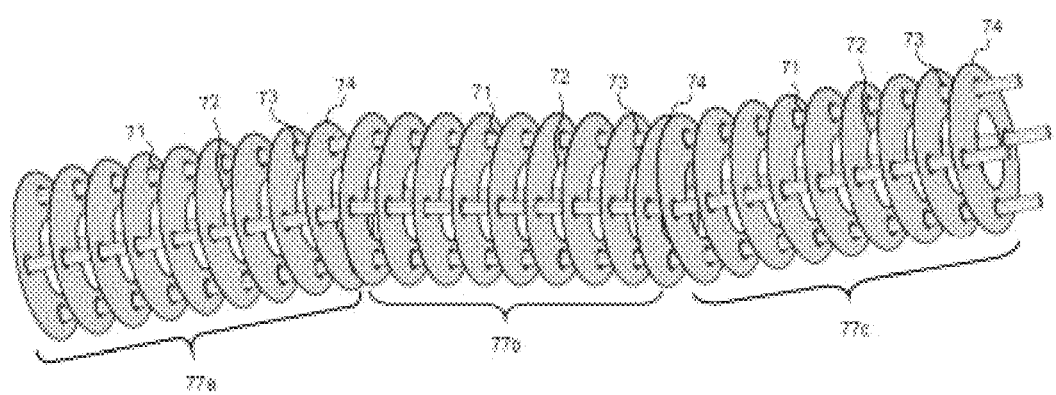

FIG. 7A and FIG. 7B show perspective views of the flexible or re-configurable ion transfer device 20 in accordance with one or more embodiments of the present disclosure. In this exemplary embodiment, instead of having all of the plurality of electrodes flexibly attached to each other (like those embodiments shown in FIG. 6A, FIG. 6B, FIG. 6C, and FIG. 6D), the ion transfer device 20 may include electrode assemblies (or units) 77$a$, 77$b$, 77$c$ in which the electrodes 74 are rigidly attached to each other, and the electrode units 77$a$, 77$b$, 77$c$ (electrode units are also referred to as electrode assemblies in the present disclosure) are flexibly attached to each other. The plurality of electrodes 74 each having a central hole 72 may be connected to adjacent electrodes using rigid rods 61$a$-$d$, which go through a plurality of holes 72 provided on each of the plurality of the electrodes 74. In other embodiments, the electrodes 74 may be fixed to each other with glue, epoxy, or screws while maintaining a predetermined spacing in a range of 0.05 to 5 mm between the electrodes 74. The electrode assemblies (units) 77$a$, 77$b$, 77$c$ are flexibly attached to each other and provide the flexibility.

FIG. 8A, FIG. 8B, and FIG. 8C show front views of three embodiments of the electrodes of the flexible or re-configurable ion transfer device 20 in accordance with one or more embodiments of the present disclosure. In one embodiment shown in FIG. 8A, a printed circuit board (PCB) electrode 82 of the plurality of electrodes may be made with PCB. The PCB electrode 82 may include a plurality of holes 81$a$-$d$ that provide a path for the rods 61$a$-$d$. A center hole 83 in the PCB electrode 82 provides a path for ions in the center area of the PCB electrode 82. Around the center hole 83, a metal track 84 acts as a conductive electrode for application of voltages to produce electric fields in and around the center hole 83 necessary for transferring ions. The metal track 84, which may be copper, or gold-immersion electrodes used in PCB manufacturing similar to through-hole assemblies well-known in PCB production but with much larger diameter. The diameter of the hole 83 may be a value between 0.2 inches to 10 inches. A resistor 86$a$ and a capacitor 86$b$ may be assembled on the PCB electrode 82 to provide the necessary DC voltage and RF voltage, respectively. A plurality of connectors 85$a$-$b$ connect to adjacent PCB electrode 82 or DC and RF power supplies to provide the required voltages.

In one embodiment shown in FIG. 8$b$, a PCB electrode 82 of the plurality of electrodes 63 may be circular shape. One of ordinary skill in the art would recognize that the electrodes may be made in any arbitrary shape. In one embodiment shown in FIG. 8C, a PCB electrode 82 of the plurality of electrodes 63, instead of a plurality of holes 81$a$-$d$ that provide a path for the rods 61$a$-$d$ (as shown in FIG. 8A with annotations 81$a$-$d$), the PCB electrode 82 may include a plurality of electrically insulated structures 88$a$-$d$ to flexibly connect two adjacent PCB electrodes 82. The plurality of electrically insulated structures 88$a$-$d$ may be made with pogo-pins, or elastic balls, or O-rings attached to the board.

FIG. 9A, FIG. 9B, FIG. 9C, FIG. 9D, and FIG. 9E show cross section views of electrodes 91 of the flexible or re-configurable ion transfer device 20 connected to each other in accordance with one or more embodiments of the present disclosure. The electrodes 91 may be stacked on each other, as shown in FIG. 9A and may be centered around an axis 96, which may cross the centers of holes 94 on electrodes 91. A plurality of spacers 92a-d may be placed in between the electrodes 91 to provide the required spacing between electrodes and also the re-configurability and flexibility. The electrodes 91 may include a resistor 95 and capacitor 93. This configuration provides flexibility for the ion transfer device 20. The electrodes 91 each having an electrode axis 96a-c may be flexibly bend around the axis 96. The degree of bending is defined as the angle between the axis 96 and each electrode axis 96a-c corresponding to the plurality of electrodes 91. The degree of bending may be any value between 0.0001 to 5 degrees for each electrode 91. In some embodiments, only some of the electrodes 91 may bend around the axis 96. In some embodiments, instead of employing the plurality of spacers 92a-d, a heat-shrink tube 99 may keep the electrodes 91 in place (electrically separated from each other) while maintaining flexibility. In other embodiments, both the plurality of spacers 92a-d, and heat-shrink tube 99 may keep the electrodes 91 in place while providing flexibility. The heat-shrink tube may also serve as the enclosure 71 to maintain the electrodes 91 in reduced pressure as disclosed earlier in the present application. Although FIG. 9C shows only one layer of heat-shrink tube 99, but one or more layers of heat-shrink tube 99 may be provided to adjust flexibility and the pressure inside the ion transfer device 20. In one embodiment, a plurality of wires, which may be disposed outside or inside the enclosure 71 (which may be for example the heat-shrink tube 99) provide required electrical radio frequency (RF), or direct current (DC) voltages (or constant voltage). The voltages may be provided in pulsed mode, with pulse durations of, for example, 0.1, 0.5, 1, 5, 10, 100, or 1000 milliseconds. The pulsed voltages may be periodic, having a period of 0.01, 0.1, 0.5, 1, or 2 seconds, or more than 2 seconds. In other embodiments, a plurality of heat-shrink tubes may be provided, and the electrical wires may be disposed in between the layers of the heat-shrink tube.

Figure 9D:
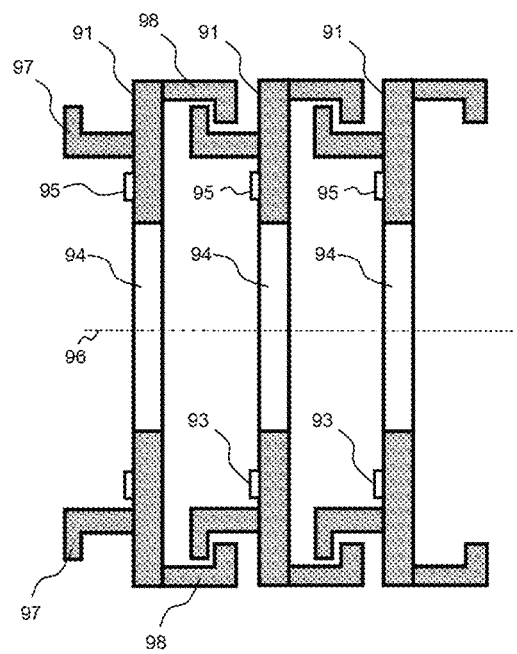
Figure 9E:
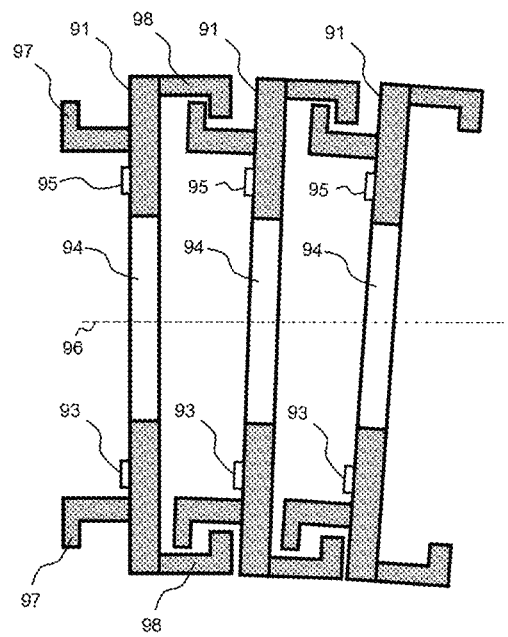

In one or more embodiment shown in FIG. 9D and FIG. 9E, instead of using the plurality of spacers 92a-d (as shown for example in FIG. 9A), the electrodes 91 may have matching extrusions 97, 98 on two sides of the electrode 91 that are engaged with corresponding matching extrusions 97, 98 of adjacent electrodes 91, as shown in FIG. 9D and FIG. 9E, to provide flexibility as disclosed in the present application. One of ordinary skill in the art would recognize that this structure may be manufactured by separate electrodes 91 flexibly connected to each other and having many degrees of freedom such as those found in "snake robots" having many degrees of freedom or may be manufactured by rolling a structure having matching extrusions 97, 98 similar to those used in conventional flexible electrical conduits.

Figure 10A:
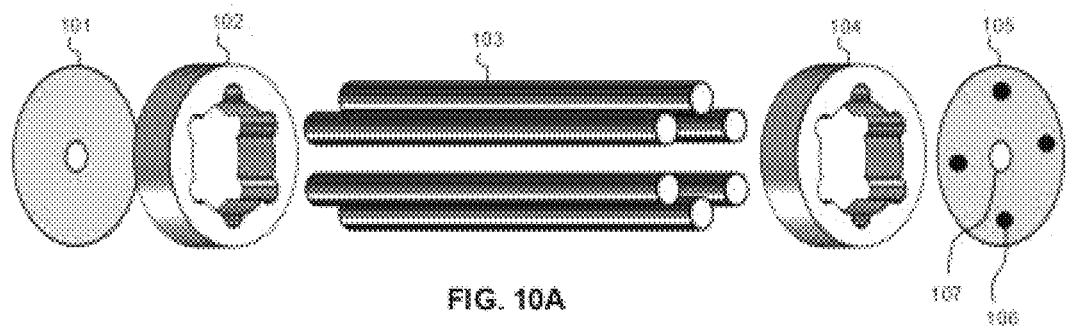
FIG. 10A and FIG. 10B show perspective views of electrode structure of flexible or re-configurable ion transfer device in accordance with one or more embodiments of the present disclosure.
Figure 10B:
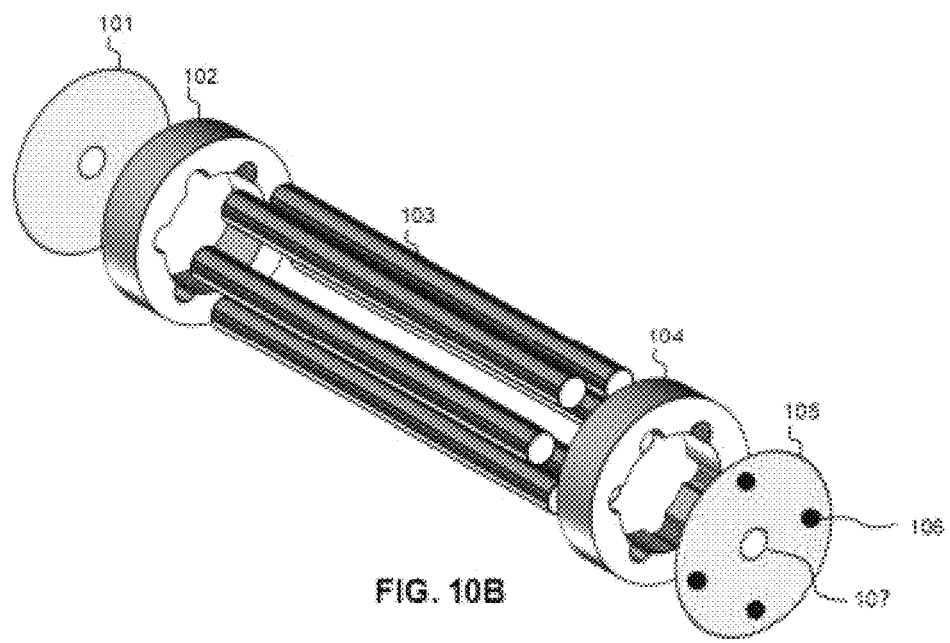

FIG. 10A and FIG. 10B show perspective views of individual electrodes of the flexible or re-configurable ion transfer device 20 in accordance with one or more embodiments of the present disclosure. For simplicity of illustration, the enclosure is not shown in these figures. FIG. 10A and FIG. 10B show a multipole ion guide that includes a plurality of rods 103 connected to DC and/or RF voltages. Multiple ion guides may have any even number of rods, such as four, six, eight, etc that are hold in place with a plurality of rod holders 102, 104. Two conductance limiting plates 101, 105 having an orifice 107 are attached at the two ends to the rod holders 102, 104. The conductance limiting plates 101, 105 may be connected to DC or RF voltages (for example at a frequency of 0.1 MHz to 10 MHz). A plurality of electrically insulating pieces 106 (which may be made by elastic materials such as Viton) may be connected to the conductance limiting orifices 107 to provide flexibility. The odd and even numbers of the plurality of rods 103 are respectively connected to two out of phase RF voltages. A DC offset voltage may be applied to all of the rods 103.

Figure 11A:
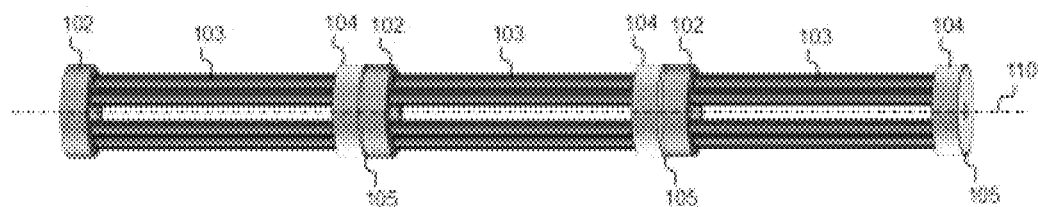
FIG. 11A, FIG. 11B, and FIG. 11C show perspective views of flexible or re-configurable ion transfer device including three electrode structures connected to each other in accordance with one or more embodiments of the present disclosure.
Figure 11B:
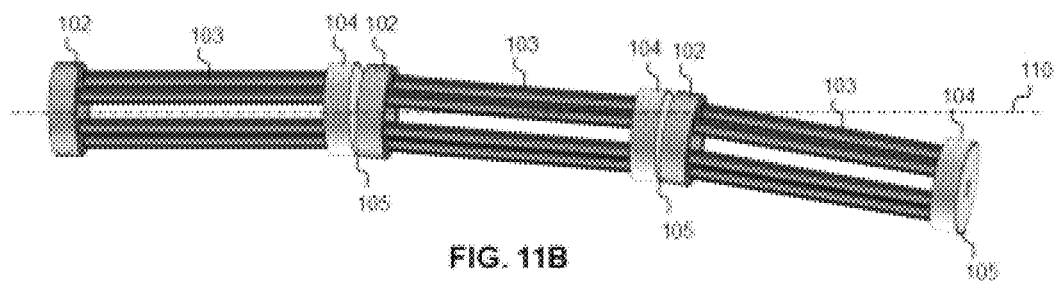
Figure 11C:
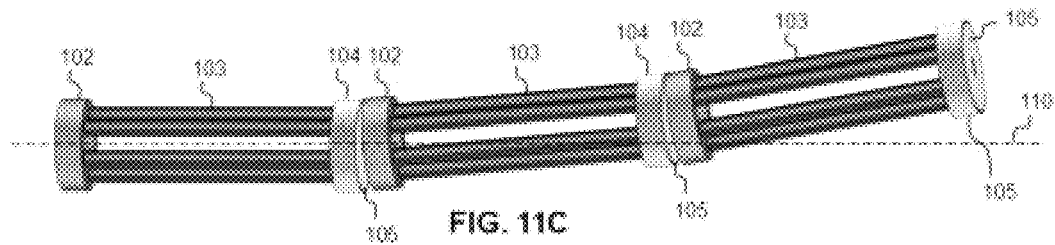

FIG. 11A, FIG. 11B, and FIG. 11C show perspective views of three electrodes of the flexible or re-configurable ion transfer device 20 connected to each other in accordance with one or more embodiments of the present disclosure. In one embodiment, the ion transfer device 20 may be constructed with multipole ion guides (each acting as one electrode unit) flexibly attached to each other. A plurality of individual electrodes (each electrode including the components as shown in FIG. 10A and FIG. 10B) may be connected to each other as shown in FIG. 11A, FIG. 11B, and FIG. 11C to provide a flexible ion transfer device 20. The two conductance limiting plates 105 on two adjacent electrodes are connected to each other with the plurality of electrically insulating pieces 106 placed in between to provide flexibility. In another embodiment, the two electrodes or multipole ion guide structures may be connected to each other with the structure shown in FIG. 9A and FIG. 9B to provide flexibility. Heat-shrink tubes may also be used as enclosure and are not shown for simplicity of illustration.

Figure 12A:
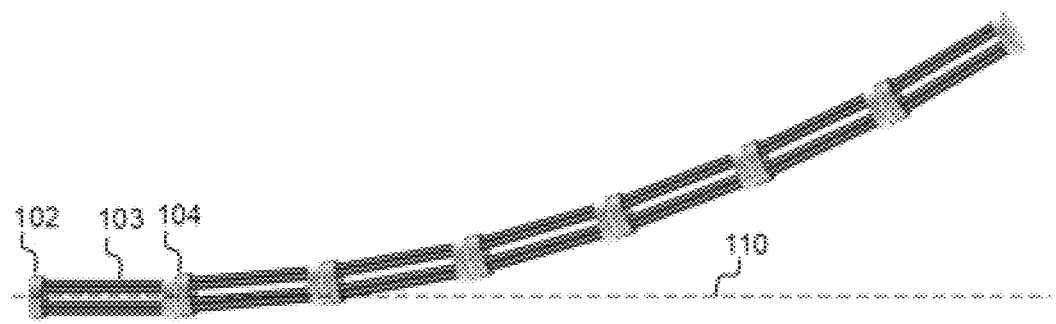
FIG. 12A and FIG. 12B show perspective views of flexible or re-configurable ion transfer device including seven electrode structures connected to each other in accordance with one or more embodiments of the present disclosure.
Figure 12B:
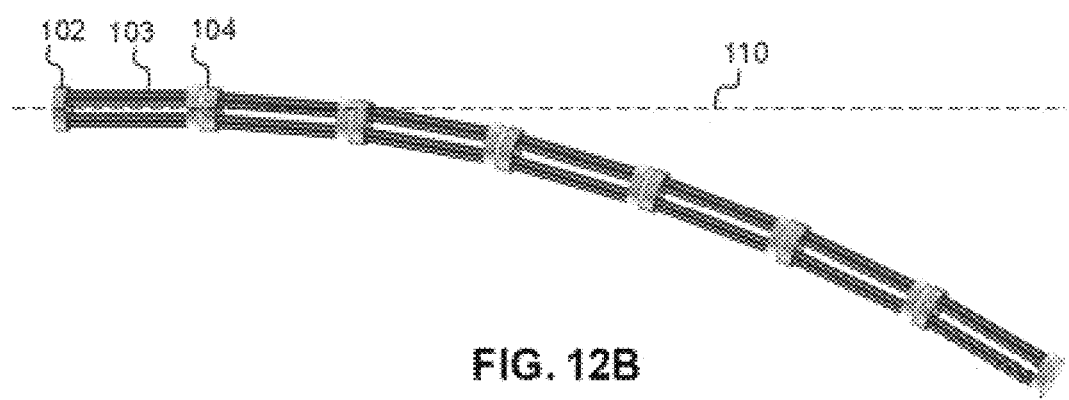

FIG. 12A and FIG. 12B show perspective views of seven electrodes of the flexible or re-configurable ion transfer device 20 connected to each other in accordance with one or more embodiments of the present disclosure. In one embodiment, the electrodes may have a plurality of curvatures or bends around an axis 110 of the ion transfer device 20. The enclosure is not shown in this figure for simplicity of illustration. The flexibility of this structure may be similar to those shown in FIG. 7A and FIG. 7B.

Figure 13:
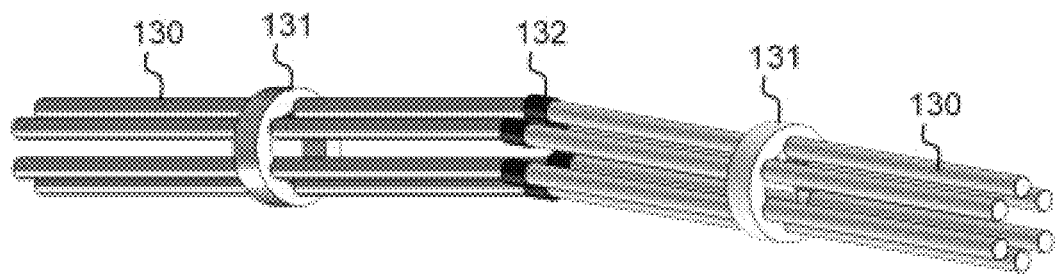
FIG. 13 shows a perspective view of flexible or re-configurable ion transfer device including two electrode structures connected to each other accordance with one or more embodiments of the present disclosure.

FIG. 13 shows a perspective view of two electrodes of the flexible or re-configurable ion transfer device 20 connected to each other in accordance with one or more embodiments of the present disclosure. In one embodiment, the multipole ion guides may include a plurality of rods 130 that are hold in place with a rod holder 131. To provide flexibility, the rods 130 of the two adjacent electrodes are connected flexibly to each other as shown in FIG. 13 with a plurality of connecting pieces 132. The plurality of conducting pieces connect two corresponding rods 130 to each other. The plurality of connecting pieces 132 may be conductive or electrically insulating, which may be made by, for example, connecting the rods with flexible epoxy. In another embodiment, the plurality of rods 130 may be flexible while maintaining a constant or semi-constant distance between two adjacent rods in an electrode assembly to provide a flexible ion transfer device 20.

Figure 14A:
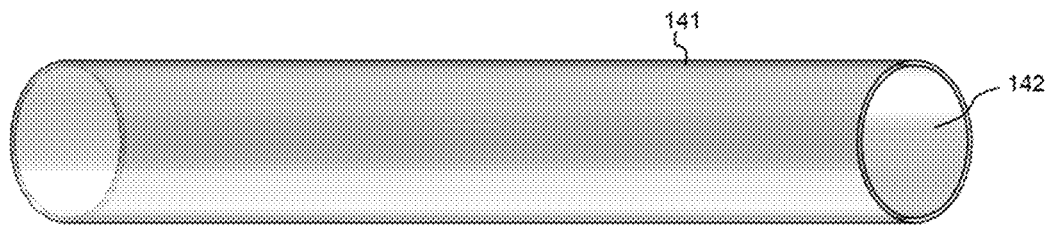
FIG. 14A, FIG. 14B, and FIG. 14C show perspective views of enclosure and electrode geometries of flexible or re-configurable ion transfer device in accordance with one or more embodiments of the present disclosure.
Figure 14B:
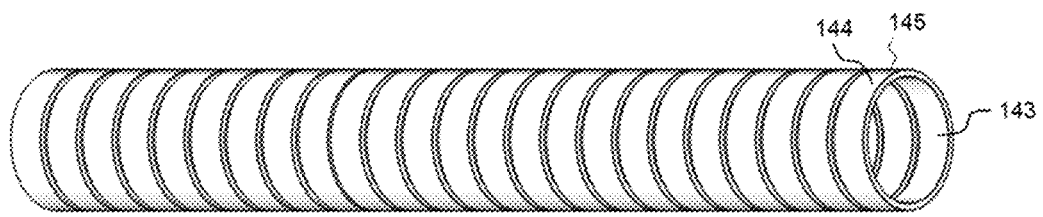
Figure 14C:
Figure 15A:
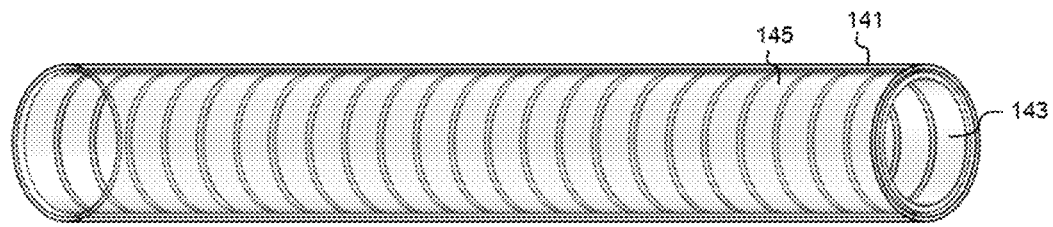
FIG. 15A, FIG. 15B, and FIG. 15C show perspective views of flexible or re-configurable ion transfer devices in accordance with one or more embodiments of the present disclosure.
Figure 15B:
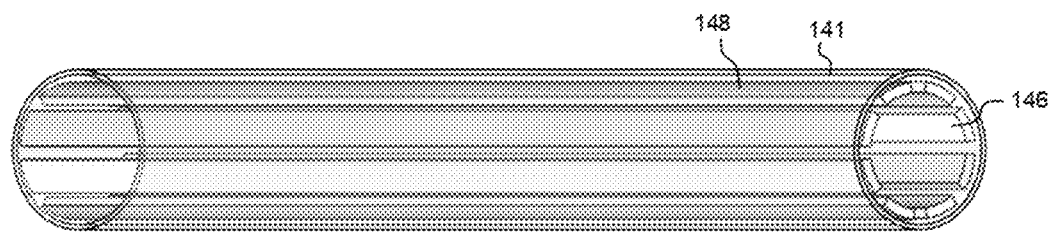
Figure 15C:
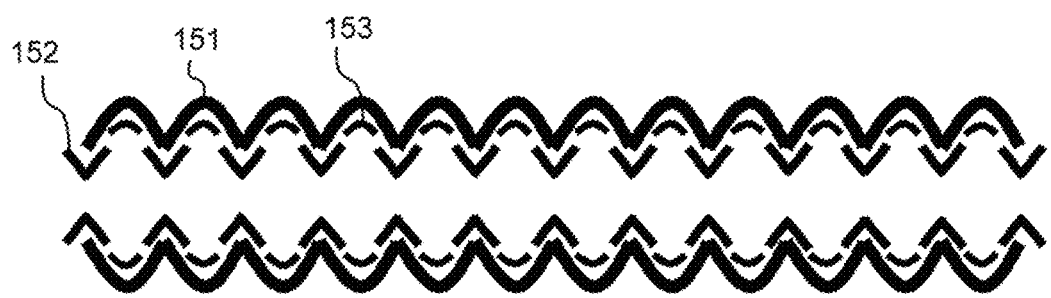

FIG. 14A, FIG. 14B, and FIG. 14C show perspective views of an enclosure and two different electrode geometries of the flexible or re-configurable ion transfer device 20 in accordance with one or more embodiments of the present disclosure. FIG. 15A, FIG. 15B, and FIG. 15C show perspective views of three embodiments of the flexible or re-configurable ion transfer device 20 in accordance with one or more embodiments of the present disclosure. In one embodiment, the enclosure 21 may be made of a flexible tube 141 having an inner surface 142 as shown in FIG. 14A. A plurality of ring electrodes 145, as shown in FIG. 14B, are connected to a plurality of DC and RF voltages (not shown for simplicity of illustration) may be disposed inside the flexible tube 141 to provide the ion transfer device 20. Each of the plurality of ring electrodes 145 may include an inner surface 143 and an outer surface 144. The outer surface 144 may be disposed on the inner surface 142 of the flexible tube 141 to provide an ion transfer device 20 as shown in FIG. 15A. In another embodiment, a plurality of elongated electrodes 148 (any even number of electrodes) having an outer surface 147 and an inner surface 146 may be disposed in the flexible tube 141. FIG. 15B shows an example of the ion transfer device 20 according to this exemplary embodiment. The ring electrodes 145 and the elongated electrodes 148 are flexible and may bend when the flexible tube 141 bends. The flexible tube 141 may be made with a heat-shrink tube that has a sticky inner surface 142 for sticking to the outer surface 144 of the ring electrodes 145 or the outer surface 147 of the plurality of elongated electrodes 148 to the inner surface 142 of the flexible tube 141. FIG. 15C show a cross section of another embodiment of a flexible ion transfer device 20 which may be made with bellow tube 151 and a plurality of electrodes 152 may be place inside the bellow tube 151. In this embodiment, a plurality of ground electrodes 153 prevent ions from charged build-up on the bellow tube 151. Although these embodiments are shown in straight form, one of ordinary skill in the art, in view of the present disclosure, would understand and appreciate that these structures provide flexibility and may be bent to any form or shape similar to a conventional hose.

Figure 16:
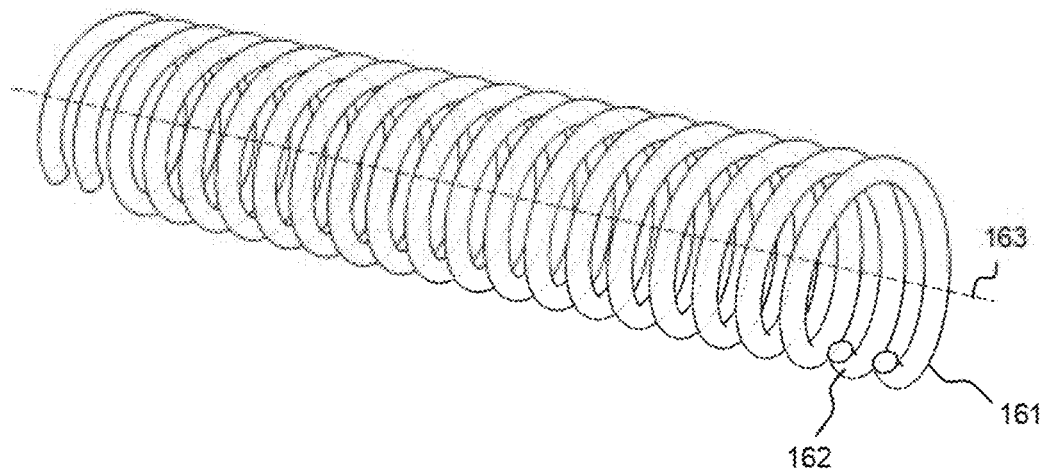
FIG. 16 shows a perspective view of electrode geometry of flexible or re-configurable ion transfer device in accordance with one or more embodiments of the present disclosure.

FIG. 16 shows a perspective view of electrode geometry in an embodiment of the flexible or re-configurable ion transfer device 20 in accordance with one or more embodiments of the present disclosure. The flexible ion transfer tube 20 may be constructed with two wires 161, 162 (or a plurality of the two wires 161, 162) that are wound around an axis 163 into helix structures having a diameter with any value in the range of 0.2 to 6 inches. The two wires are connected to RF voltages at a frequency of 0.05 to 10 MHz and amplitudes of, for example, 50V. The amplitude may be any value between 1 to 1000V. The enclosure is not shown in FIG. 16 for simplicity of illustration but similar flexible tubes, or heat-shrink tubes disclosed earlier in the present application may be used. The ion transfer device 20 made with the electrodes shown in FIG. 16 is flexible and may have several curvatures along the length of the ion transfer device 20. As noted above, the pressure of the ion transfer tube may be in the range of, for example, 0.001 to 760 Torr.

Figure 17A:
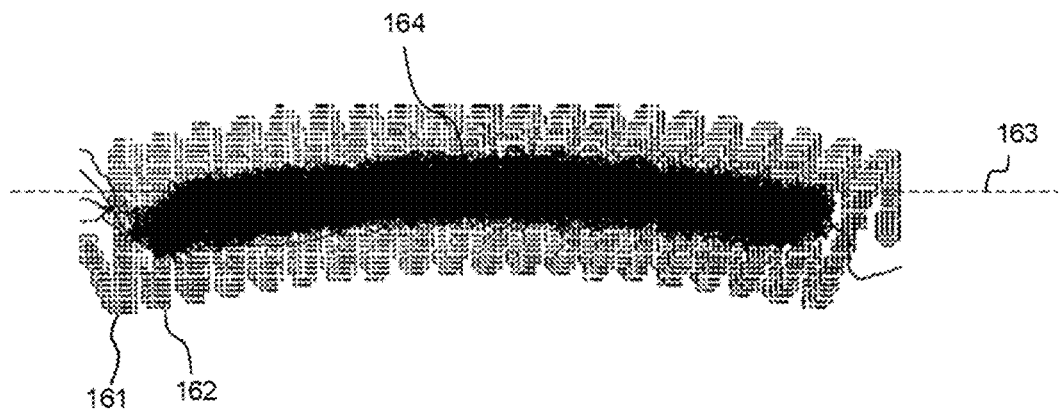
FIG. 17A and FIG. 17B show two side views of ion trajectory simulation in flexible or re-configurable ion transfer device in accordance with one or more embodiments of the present disclosure.
Figure 17B:
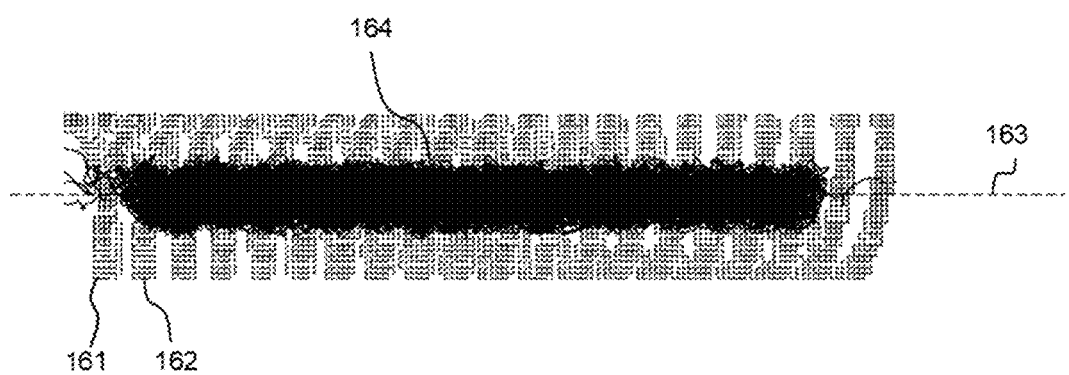

FIG. 17A and FIG. 17B show two side views of ion trajectory simulation in an embodiment of the flexible or re-configurable ion transfer device 20 in accordance with one or more embodiments of the present disclosure. Ion trajectory simulations were performed with SIMION® software and the results are shown in FIG. 17A (side view) and FIG. 17B (top view). The simulations were performed in a pressure of 1 Torr and the simulation results demonstrated that the electrodes effectively trap the ions, producing an ion cloud 164, for a long period of time. The simulations were performed in a bent structure of FIG. 16 around an axis 163. A variety of RF voltages were applied at different frequencies and voltages and the structure was functional in a wide range of parameters (voltage and amplitude of the RF voltage) and pressures (0.01 to 30 Torr).

Figure 18:
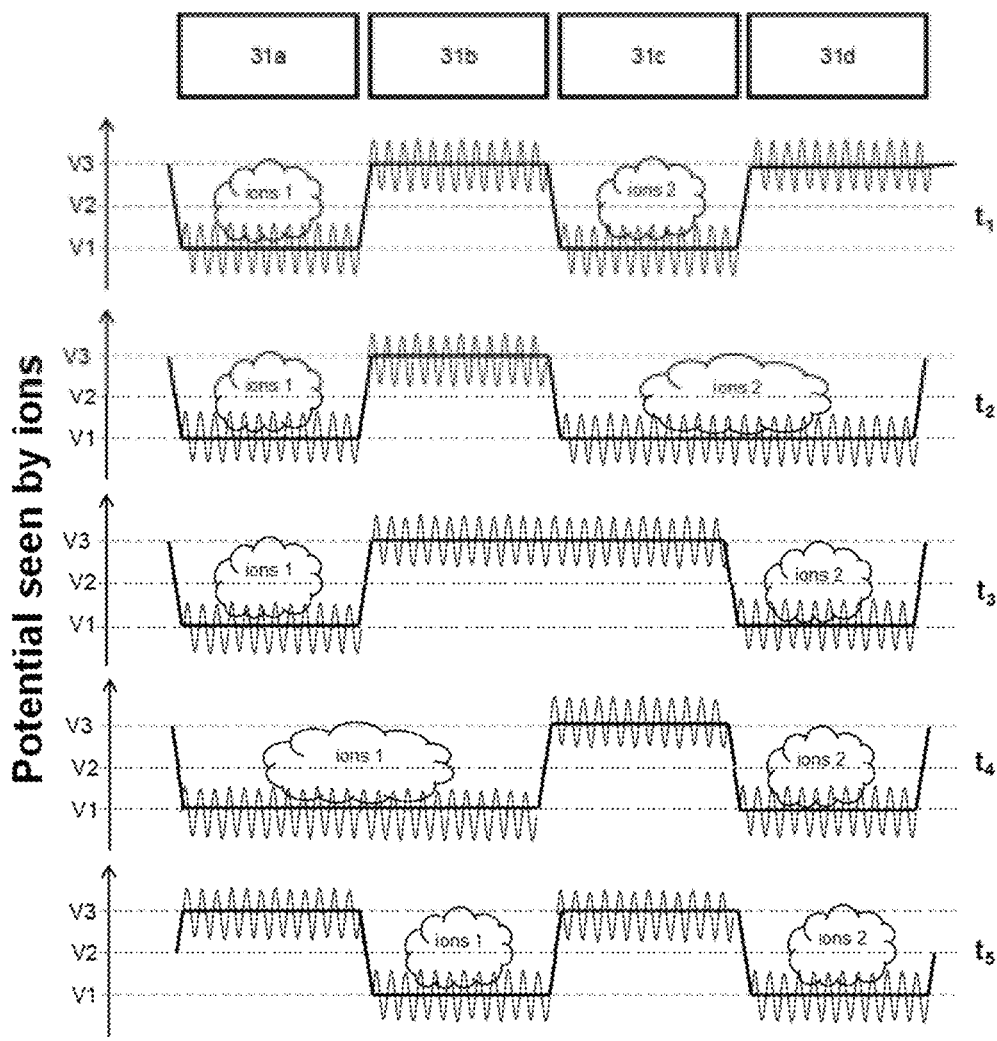
FIG. 18 shows RF and DC voltage waveforms for flexible or re-configurable ion transfer device in accordance with one or more embodiments of the present disclosure.

FIG. 18 shows RF and DC voltage waveforms applied to the electrodes of the flexible or re-configurable ion transfer device in accordance with one or more embodiments of the present disclosure. In the five sequential graphs shown in FIG. 18, the times are shown by t1 to t5, t1 graph being the first wave form of the sequence and t5 being the last wave form of the sequence. The time period between each graph may be the same or different. For example, the time difference between t1 and t2 may be in the order of milliseconds (ms) or seconds (s), and may be any value between 0.1 ms to 10 s.

The electrode units 31a-d may comprise any electrode configuration, geometry, shape, or form disclosed in the present application. The plurality of electrode units 31a-d may be those disclosed in FIG. 6A, in which every even and odd electrode is connected to two out of phase RF voltages respectively. Two out of phase RF voltages are applied to two adjacent electrodes. For example, in a multipole ion guide, one of the two out of phase RF voltages is applied to every other electrode and the other of the two out of phase RF voltages is applied to the remaining electrodes. RF voltages of the ion transfer device 20 pushes the ions radially toward the centerline or an axis of the ion transfer device 20 as disclosed and shown above in exemplary embodiments, and as for example shown in the simulation results of FIG. 17A and FIG. 17B, which is an RF only simulation. The radial force is provided via an effective potential from RF voltages or waveforms on the electrodes. The RF waveforms effectively keep ions off the plates. The DC voltages push ions axially toward the two ends of the ion transfer device 20. The applied RF voltages trap ions around an axis and inside the ion transfer device 20.

In FIG. 18, DC voltages are illustrated with solid lines and the RF voltages are illustrated with a sine or zigzag waveform. Although the DC and RF voltages are illustrated separately for simplicity of illustration, one of ordinary skill in the art would understand that these two wave forms may be combined, superimposed or added by application of the RF voltages via a capacitor to the DC voltages. The DC voltage sources providing the DC voltages may require RF chokes to prevent the RF voltage from penetrating into the DC power supply. The DC voltages may also be regarded as the DC offset voltage applied to the RF voltage. The RF voltage (two out of phase sin waveform applied for radially pushing the ions towards a center of the ion transfer device 20) may always be present in the electrodes of the ion transfer device 20. Alternatively, the RF voltage may only be present when ions exists in the related electrodes of the ion transfer device 20.

The term "electrode unit" in the present application is defined as a number of electrodes that contain an ion packet, for example ion 1 or ion 2 as shown in FIG. 18. Each of the electrode units 31a-d is an electrode unit that may contain any number of electrodes but trap and contain an ion packet as described earlier in the present application.

In t1, two packet of ions, ions 1 and ions 2, are held in DC potential wells created in electrode units 31a and 31c at V1 voltage. The ions 1 and ions 2 may be from the same ion source or from different ion sources. Also, the ions 1 and ions 2 may contain the same or different types of ions obtained from the same or different samples by the ionization source. The DC voltage at electrode unit 31b and 31d are at V3, which is greater than V1. Therefore, the DC voltages of the electrode units 31b and 31d act as a potential barrier and prevent the two ions packets (which may be in the form of ion clouds or ion population) from mixing with each other. The values of DC voltages may be any positive value in a range from 0.1V to 1000V.

In t2, the DC voltage of the electrode unit 31d is reduced from V3 to V1, thus allowing the ions 2 to axially expand to the adjacent electrode unit 31d (the ions are still radially contained with the RF voltages—in fact, the ions 1 and ions 2 are always contained in the centerline by RF voltages as described above). The potential well of the electrode 31b prevents the ions 1 and ions 2 from mixing with each other.

In t3, the DC voltage on electrode unit 31c is increased from V1 to V3 thus forcing or pushing the ions 2 into the electrode unit 31d. Therefore, the ions 2 are shifted one electrode unit to the right.

In t4, the DC voltage of the electrode unit 31b is reduced from V3 to V1, thus allowing the ions 1 to axially expand to 31b electrodes. The potential well of the electrode 31c prevents the ions 1 and ions 2 from mixing with each other.

In t5, the DC voltage on electrode unit 31a is increased from V1 to V3 thus pushing the ions 1 into the electrode 31b. Therefore, the ions 1 are also shifted one electrode unit to the right (where the ion outlet of the ion transfer device 20 is located in this exemplary embodiment).

During the sequences from t1 to t5, two separate ion packets, ions 1 and ions 2 are shifted one electrode unit from the ion inlet side of the ion transfer device (on the left) to the ion outlet side of the ion transfer device 20 (on the right). Therefore, this sequence enables sequentially packing and efficiently transferring the ions or ion clouds via the flexible ion transfer device 20 without these ion packets being mixed. The ion transfer may be performed in a sequential manner and the ions, in the form of ion packets, may be transferred from the inlet to the outlet of the ion transfer device 20 sequentially. Further, this sequence also allows arrangement of ions produced from different ion sources or produced from the same ion source but from different samples, into ion packets. Although in each time frame of t1 to t5 of FIG. 18 the DC voltage values V1 and V3 are used, each electrode 31a-d may have a different voltage value and they do not need to be necessarily the same.

Figure 19:
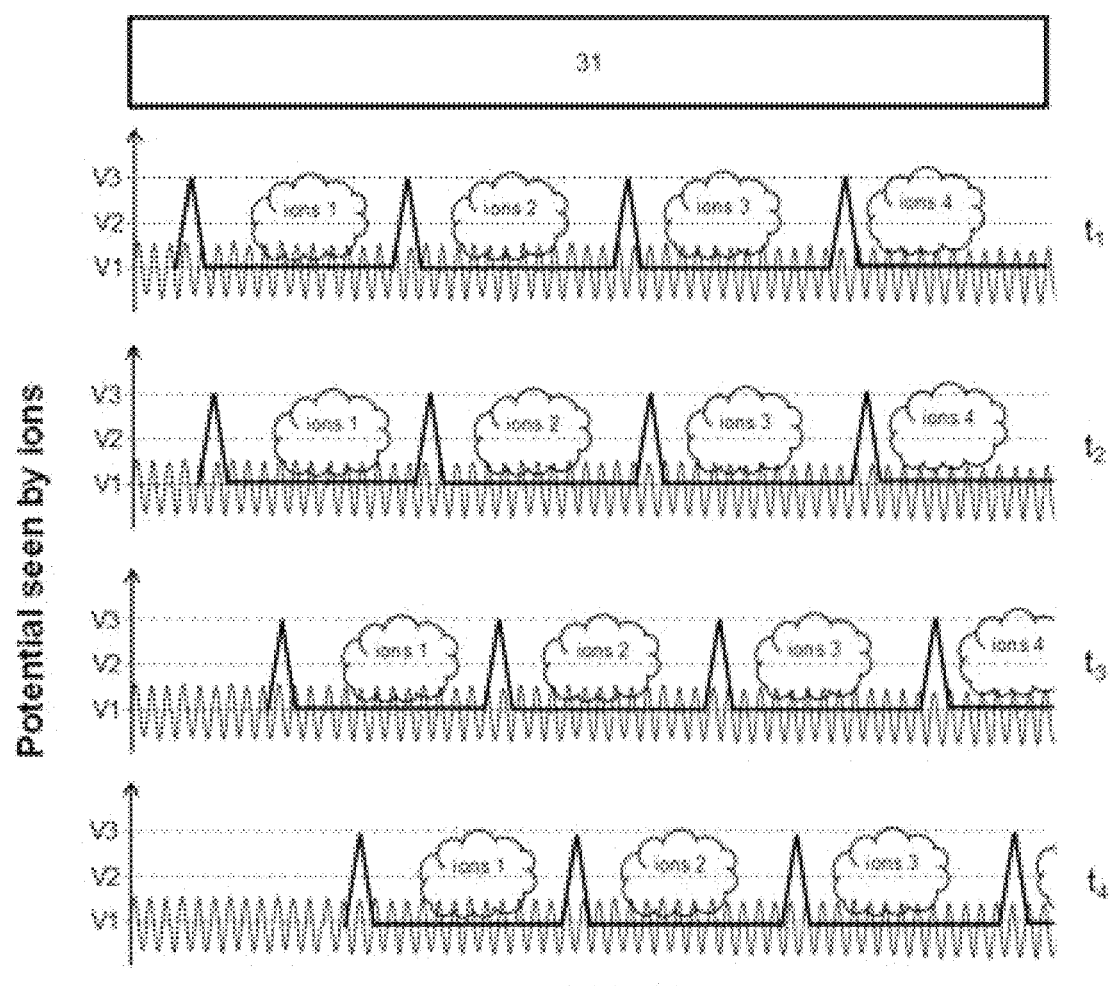
FIG. 19 shows RF and DC voltage waveforms for flexible or re-configurable ion transfer device in accordance with one or more embodiments of the present disclosure.

FIG. 19 shows RF and DC voltage waveforms applied to the electrode unit 31 of the flexible or re-configurable ion transfer device 20 in accordance with one or more embodiments of the present disclosure. The RF and DC voltages are described in detail with respect to FIG. 18, and the same description is applicable to FIG. 19. The electrode 31 may comprise of a plurality of ring electrodes similar to those shown in FIG. 6A, FIG. 6B, and FIG. 6C. In exemplary embodiment shown in FIG. 19, DC voltages are individually controlled and applied to each electrode of the electrode unit 31. In the following, the applications and shifting of ion packets are described for the electrode unit 31 with ring electrodes similar to those shown in FIG. 6A but one of ordinary skill in the art would understand and appreciate that the shifting of ion packets may also be realized with other electrode geometries of the ion transfer device 20 as disclosed in the present application.

In this exemplary embodiment, each electrode unit is one electrode, for example one ring electrode (shown in FIG. 6A) is one electrode unit, and the shifting of the ion packets are performed in one electrode unit at each time period (t1 to t5).

In t1, four packet of ions, ions 1, ions 2, ions 3, and ions 4 (in the form of ion packets), are trapped separately by DC potential wells created in electrode unit 31 created by application of V3 to four of the ring electrodes which are spatially separate (first group of ring electrodes of the electrode unit 31). In FIG. 19 and at t1, first group of ring electrodes are held at DC voltage V3 and the remaining electrodes are at held at V1.

In t2, the ring electrodes adjacent and to the right of the first group of ring electrodes (second group of electrodes) are switched to V3 from V1, and shortly after, the first group of electrodes are switched to V1.

In t3, the ring electrodes adjacent and to the right of the second group of ring electrodes (third group of electrodes) are switched to V3 from V1, and shortly after, the second group of electrodes are switched to V1.

In t4, the ring electrodes adjacent and to the right of the third group of ring electrodes (fourth group of electrodes) are switched to V3 from V1, and shortly after (for example tens of micro seconds to milliseconds or seconds), the second group of electrodes are switched to V1.

As a result, the ion packets move sequentially in the ion transfer device 20 from left (the ion inlet) to the right (the ion outlet) while keeping the ion packets separate, for example by a traveling DC voltage pulse while the RF voltages maintain the ions around an axis of the ion transfer device 20.

The wave form of FIG. 19 is similar to the wave form of FIG. 18 with the difference that each electrode is individually connected to addressable DC voltages in FIG. 19. In FIG. 18, a group of electrodes are connected to the same DC voltage. Therefore, sequential transfer of ions according to FIG. 18 may require smaller number of individually addressable DC voltages compared to that described in FIG. 19, as in the embodiment of FIG. 19, all individual electrodes must be individually connected to controllable DC voltages.

Figure 20:
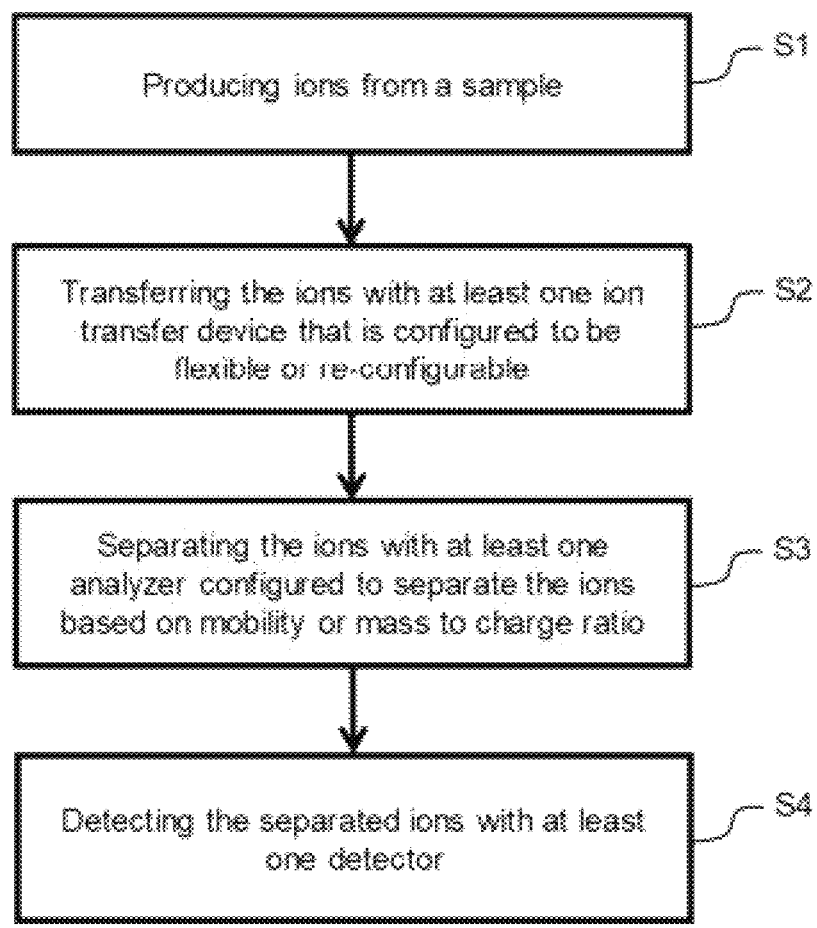
FIG. 20 shows a flow chart of a method for transferring ions with flexible or re-configurable ion transfer device in accordance with one or more embodiments of the present disclosure.

FIG. 20 shows a flow chart of a method of transferring ions with the flexible or re-configurable ion transfer device in accordance with one or more aspects of the present disclosure. In one embodiment, a method for transferring ions includes producing ions from a sample in step S1, transferring the ions with at least one ion transfer device that is configured to be flexible or re-configurable in step S2, the ion transfer device having an enclosure, and a plurality of electrodes disposed at least in part inside the enclosure; separating the ions with at least one analyzer configured to separate the ions based on mobility or mass to charge ratio in step S3; and detecting the separated ions with at least one detector in step S4. The transferring of the ions may be realized by the method and application of the waveforms described with relation to FIG. 18 and FIG. 19 to the ion transfer device 20.

Figure 21:
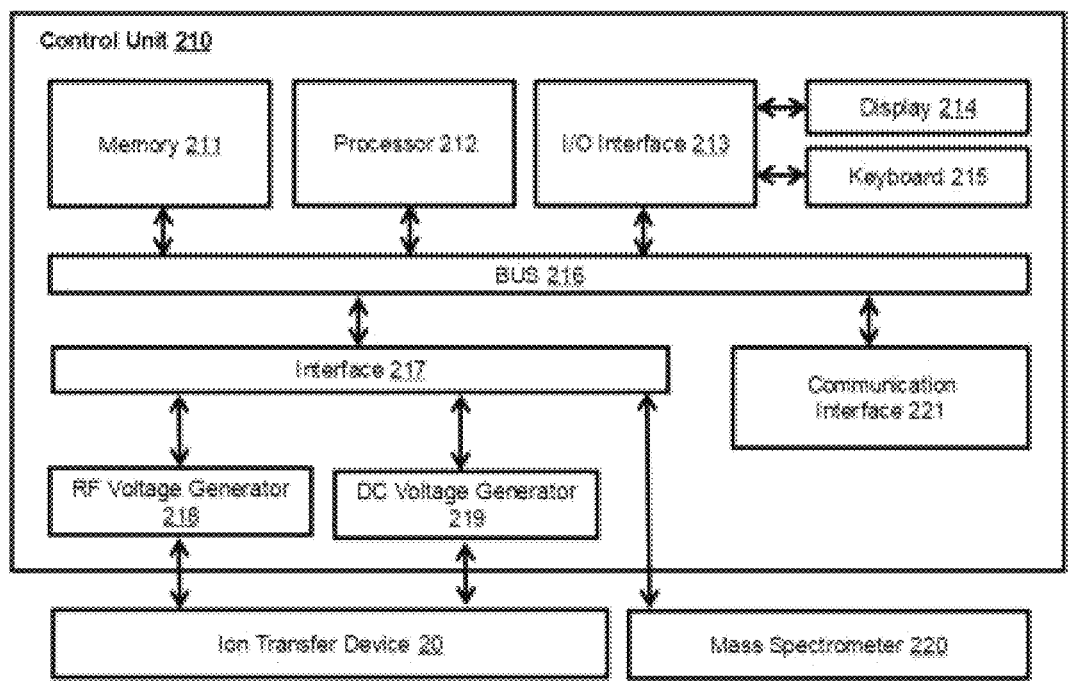
FIG. 21 shows a block diagram of control unit for ion transfer device upon which one or more embodiments of the present disclosure may be implemented.

FIG. 21 shows a block diagram of control unit 210 for ion transfer device 20 in more detail upon which an embodiment of the present disclosure may be implemented. The ion transfer device 20 may include or may be connected to one or more control units 210. The control unit 210 includes a memory 211, a processor 212, an input/output (I/O) interface 213 that is connected to a display 214 and a keyboard 215, an interface 217 that is connected to RF voltage generator 218 and DC voltage generator 219. The control unit 210 includes one or more memory 211, such as a random-access memory (RAM) or other dynamic storage device (e.g., dynamic RAM (DRAM), static RAM (SRAM), and synchronous DRAM (SDRAM)), coupled to the bus 216 for storing information and instructions to be executed by processor 212. In addition, the one or more memory 211 may be used for storing temporary variables or other intermediate information during the execution of instructions by the processor 212. The control unit 210 may further include a read only memory (ROM) or other static storage device (e.g., programmable ROM (PROM), erasable PROM (EPROM), and electrically erasable PROM (EEPROM)) coupled to the bus 216 for storing static information and instructions for the processor 212. The control unit 210 may further include a communication interface 221 coupled to the bus 216. The communication interface 221 provides a two-way data communication. For example, the communication interface 221 may be a network interface card to attach to any packet switched LAN. As another example, the communication interface 221 may be an asymmetrical digital subscriber line (ADSL) card, an integrated service digital network (ISDN) card, a Universal Serial Bus (USB), or a modem to provide a data communication connection to a corresponding type of communications line. A wired or wireless network may further be connected to the communication interface 221 connected to one or more computers that provide one or more operators and/or users a platform to communicate with the control unit 210. The control unit also includes an interface 217 that translates digital data received from the bus 216 and transmits instructions to one or more RF voltage generators 218 and one or more DC voltage generators 219, which provide the RF and DC voltages for operation of the ion transfer device 20. The RF voltage generators 218 and DC voltage generators 219 receive the instructions from the interface 217 and produce the voltages required by the ion transfer device 20. In one embodiment, the interface 217 may also be connected to a mass spectrometer 220 that is connected to the ion transfer device 20 to, for example, synchronize to adjust the timing and multiplexing of the ion transfer process according to those described in relation to FIG. 18 and FIG. 19. The interface 217 may also be connected to one or more ionization probes to synchronize production and transfer of ions from a sample.

While the present disclosure has been described above with respect to a limited number of embodiments, those skilled in the art, having the benefit of this disclosure, will appreciate that other embodiments may be devised which do not depart from the scope of the invention as disclosed herein. Accordingly, the scope of the invention should be limited only by the attached claims.

What is claimed is:

1. An apparatus comprising:
   a connector that is tubular and has a longitudinal axis, the connector including a first end that connects to a first analytical system, a second end that connects to a second analytical system, and a flexible portion between the first end and the second end that curves in a direction transverse to the longitudinal axis of the connector,
   wherein the connector contains ion guides to transfer ions between the first analytical system and the second analytical system.

2. The apparatus according to claim 1, wherein the flexible portion is located at or near the first end of the connector.

3. The apparatus according to claim 1, wherein the flexible portion is a bellows.

4. The apparatus according to claim 1, wherein a pressure inside the connector and the first analytical system and the second analytical system is lower than an atmospheric pressure outside the connector and the first analytical system and the second analytical system.

5. The apparatus according to claim 1, wherein the ion guides include a multipole for guiding the ions.

6. The apparatus according to claim 5, wherein one end of the multipole is connected to a further multipole by a joint.

7. The apparatus according to claim 1, wherein a movement between the first analytical system and the second analytical system is controlled by one or more stops.

8. The apparatus according to claim 1, wherein one of the first analytical system and the second analytical system is a mass spectrometer and the other is a system utilizing charged particles.

9. A method comprising:
   transferring ions between a first analytical system and a second analytical system via an ion transfer device,
   wherein the ion transfer device comprises:
   a connector that is tubular and has a longitudinal axis, the connector including a first end that connects to the first analytical system, a second end that connects to the second analytical system, and a flexible portion between the first end and the second end that curves in a direction transverse to the axis of the connector,
   wherein the connector contains ion guides to transfer ions between the first analytical system and the second analytical system.

10. The method according to claim 9, wherein the flexible portion is located at or near the first end of the connector.

11. The method according to claim 9, wherein the flexible portion is a bellows.

12. The method according to claim 9, wherein a pressure inside the connector and the first analytical system and the second analytical system is lower than an atmospheric pressure outside the connector and the first analytical system and the second analytical system.

13. The method according to claim 9, wherein the ion guides include a multipole for guiding the ions.

14. The method according to claim 13, wherein one end of the multipole is connected to a further multipole by a joint.

15. The method according to claim 9, wherein a movement between the first analytical system and the second analytical system is controlled by one or more stops.

16. The method according to claim 9, wherein one of the first analytical system and the second analytical system is a mass spectrometer and the other is a system utilizing charged particles.

17. A system comprising:
   a first analytical system;
   a second analytical system; and
   an ion transfer device that connects the first analytical system to the second analytical system,
   wherein the ion transfer device comprises:
   a connector that is tubular and has a longitudinal axis, the connector including a first end that connects to the first analytical system, a second end that connects to the second analytical system, and a flexible portion between the first end and the second end that curves in a direction transverse to the axis of the connector,
   wherein the connector contains ion guides to transfer ions between the first analytical system and the second analytical system.

18. The system according to claim 17, wherein the ion guides include a multipole for guiding the ions.

19. The system according to claim 17, wherein the flexible portion is located at or near the first end of the connector.

20. The system according to claim 17, wherein the flexible portion is a bellows.

21. The system according to claim 17, wherein a pressure inside the connector and the first analytical system and the second analytical system is lower than an atmospheric pressure outside the connector and the first analytical system and the second analytical system.

22. The system according to claim 17, wherein the ion guides include a multipole for guiding the ions.

23. The system according to claim 22, wherein one end of the multipole is connected to a further multipole by a joint.

24. The system according to claim 17, wherein a movement between the first analytical system and the second analytical system is controlled by one or more stops.

25. The system according to claim 17, wherein one of the first analytical system and the second analytical system is a mass spectrometer and the other is a system utilizing charged particles.

* * * * *